US008769895B2

(12) United States Patent
Amend

(10) Patent No.: US 8,769,895 B2
(45) Date of Patent: Jul. 8, 2014

(54) SUBFLOOR COMPONENT AND METHOD OF MANUFACTURING SAME

(71) Applicant: Victor Amend, Toronto (CA)

(72) Inventor: Victor Amend, Toronto (CA)

(*) Notice: Subject to any disclaimer, the term of this patent is extended or adjusted under 35 U.S.C. 154(b) by 0 days.

(21) Appl. No.: 14/102,662

(22) Filed: Dec. 11, 2013

(65) Prior Publication Data

US 2014/0096465 A1 Apr. 10, 2014

Related U.S. Application Data

(63) Continuation-in-part of application No. 13/489,712, filed on Jun. 6, 2012, which is a continuation-in-part of application No. 13/412,038, filed on Mar. 5, 2012, now Pat. No. 8,650,823.

(51) Int. Cl.
 *E04C 1/00* (2006.01)
(52) U.S. Cl.
 USPC .......................... 52/309.8; 52/309.4; 52/408
(58) Field of Classification Search
 USPC ...................... 52/309.4, 309.8, 408
 See application file for complete search history.

(56) References Cited

U.S. PATENT DOCUMENTS

| | | | |
|---|---|---|---|
| 4,623,584 A | | 11/1986 | Masui et al. |
| 4,945,697 A | * | 8/1990 | Ott et al. .................. 52/403.1 |
| 5,671,575 A | * | 9/1997 | Wu .......................... 52/403.1 |
| 5,694,730 A | | 12/1997 | Del Rincon et al. |
| 5,695,870 A | * | 12/1997 | Kelch et al. ............ 428/318.4 |
| 5,860,259 A | * | 1/1999 | Laska ....................... 52/302.3 |
| 6,468,629 B1 | * | 10/2002 | Lodder ..................... 428/158 |
| 6,607,803 B2 | * | 8/2003 | Foster ....................... 428/77 |
| 6,918,215 B2 | * | 7/2005 | Smith ....................... 52/177 |
| 7,651,757 B2 | | 1/2010 | Jones et al. |
| 2005/0158517 A1 | * | 7/2005 | Rives et al. .............. 428/158 |
| 2007/0062139 A1 | | 3/2007 | Jones et al. |
| 2008/0034690 A1 | | 2/2008 | Gartz et al. |
| 2008/0066419 A1 | * | 3/2008 | Stanchfield et al. ...... 52/716.1 |
| 2008/0086958 A1 | * | 4/2008 | Schroer et al. .......... 52/169.14 |
| 2009/0126307 A1 | * | 5/2009 | Grohman et al. .......... 52/588.1 |
| 2011/0045250 A1 | * | 2/2011 | De Zen .................... 428/168 |
| 2011/0197543 A1 | * | 8/2011 | Lee et al. ................ 52/745.05 |

FOREIGN PATENT DOCUMENTS

| | | |
|---|---|---|
| DE | 3443705 A1 | 6/1986 |
| DE | 19619892 A1 | 6/1997 |
| DE | 19721736 A1 | 11/1998 |
| DE | 29820303 U1 | 1/1999 |
| EP | 540941 | 6/1998 |
| WO | WO2006076487 | 7/2006 |

OTHER PUBLICATIONS

European Search Report issued in respect of European Patent Application No. 13154991.7; dated Apr. 5, 2014.

* cited by examiner

*Primary Examiner* — Brian Glessner
*Assistant Examiner* — Beth Stephan

(57) ABSTRACT

A subfloor component comprises an insulating rigid foam panel having first and second opposing faces and a plurality of intersecting grooves to define, in cross-section, a plurality of pedestals having at least one wall extending into the panel from the first face toward the second face; a film of substantially moisture-impervious material attached to the first face of the panel and that conforms to the tops and walls of the pedestals and to the bottoms of the grooves; and a hardboard layer on the second face of the panel.

16 Claims, 25 Drawing Sheets

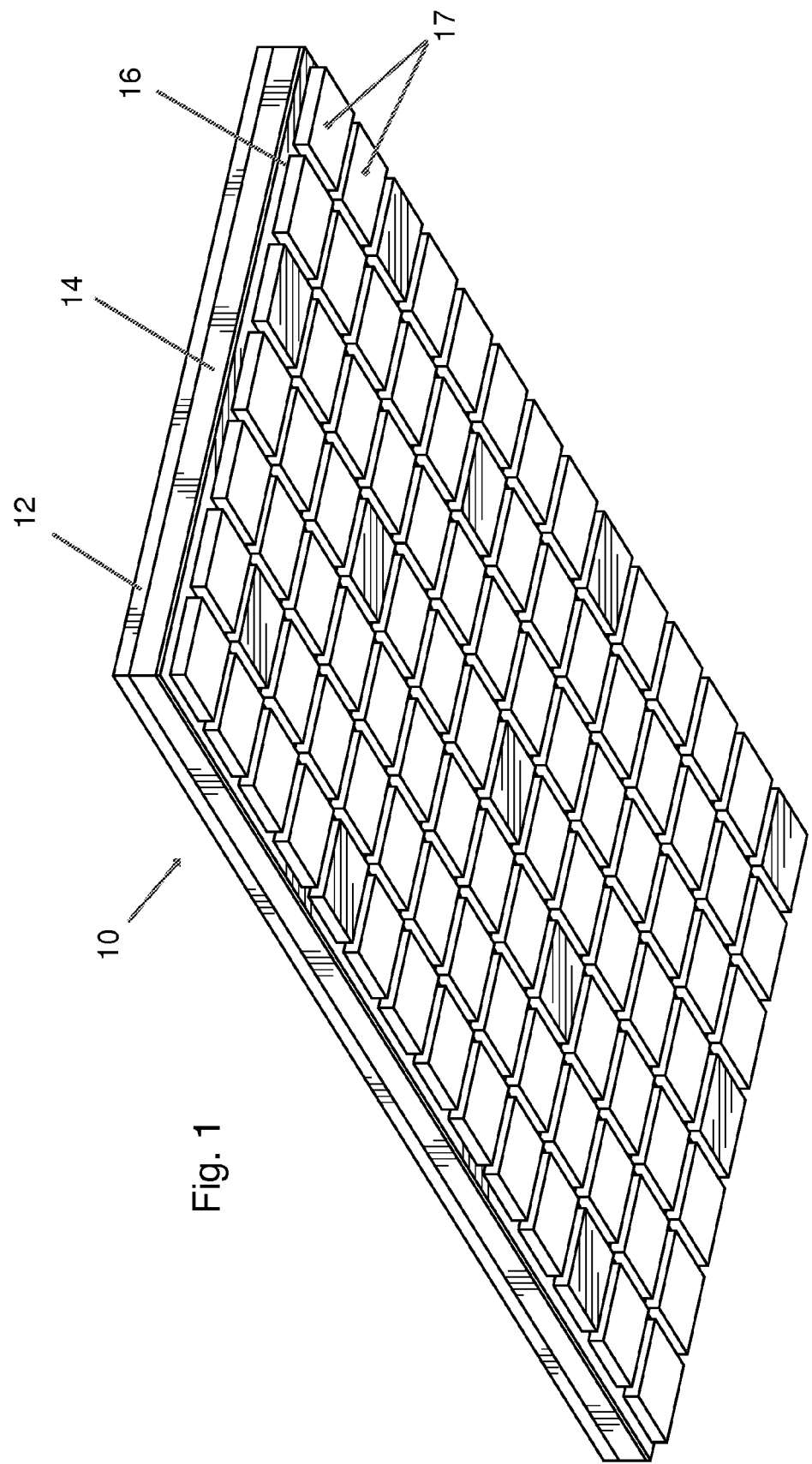

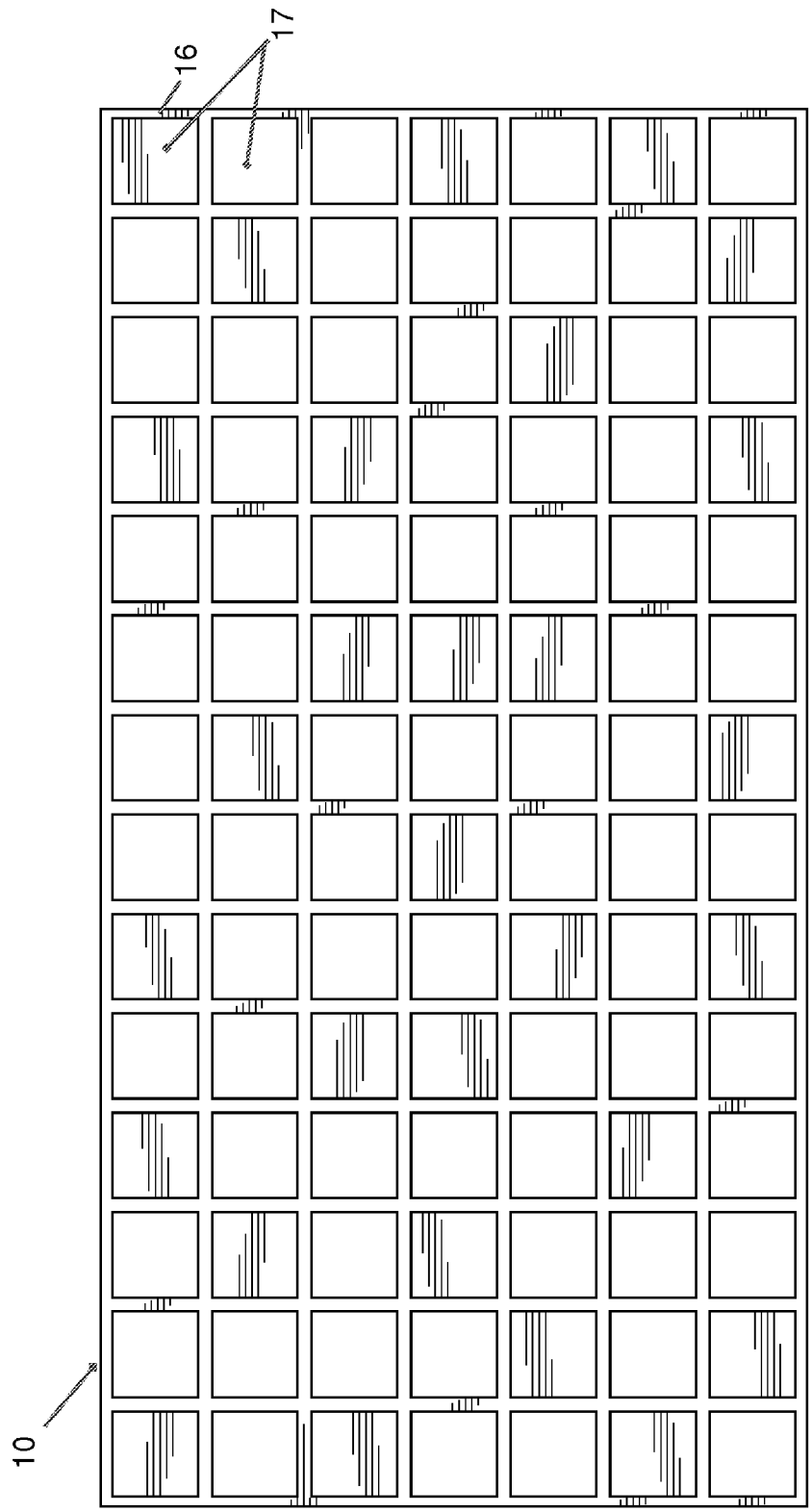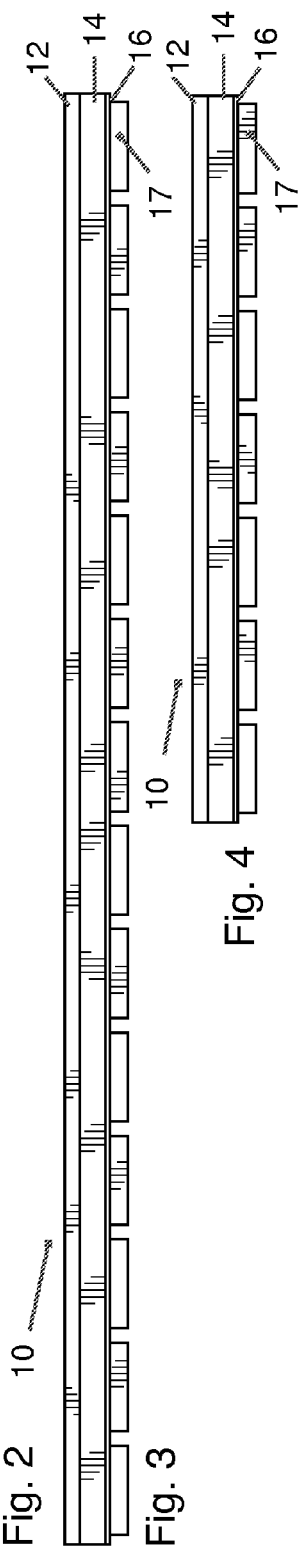

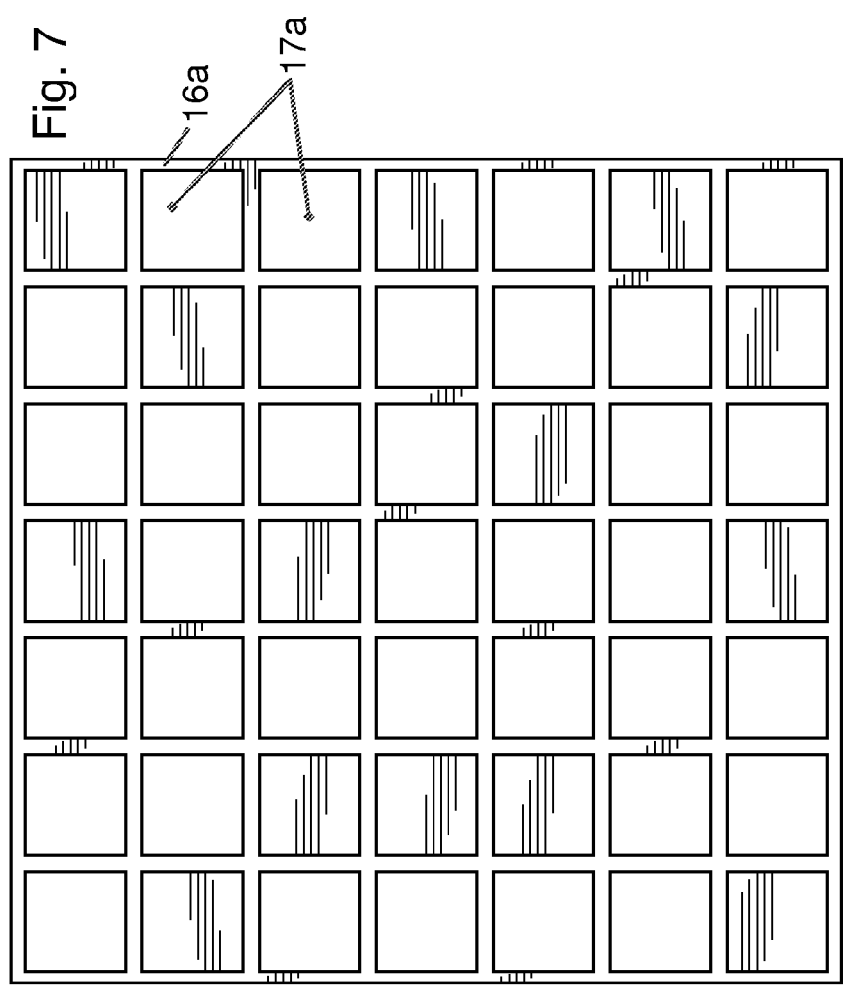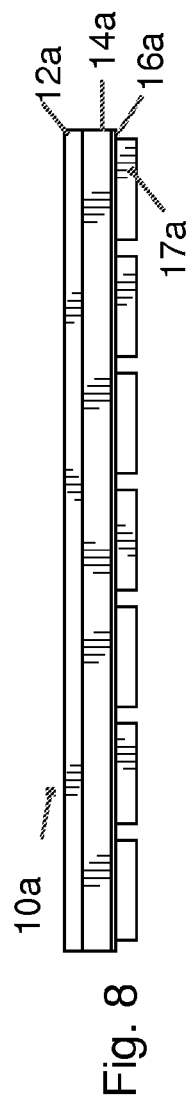

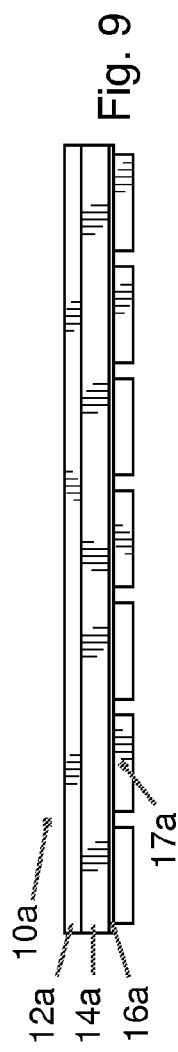
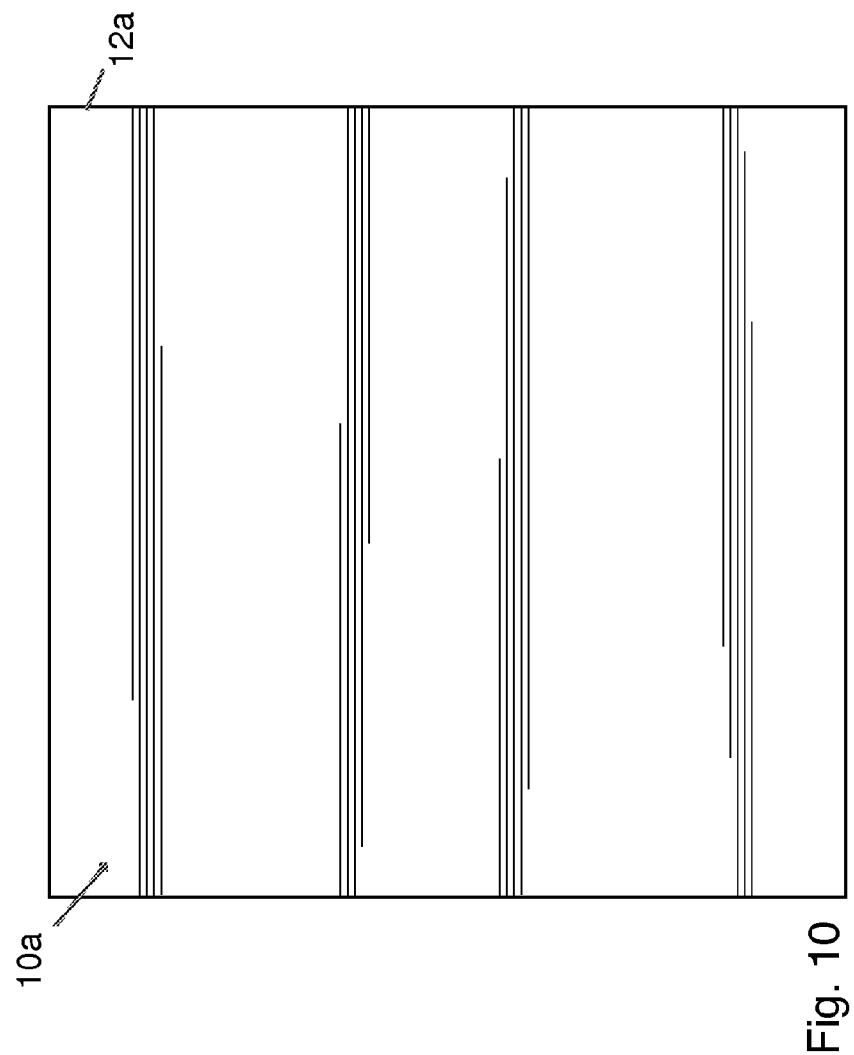

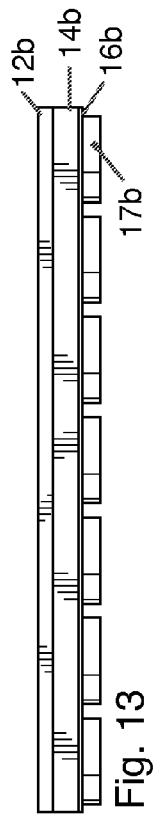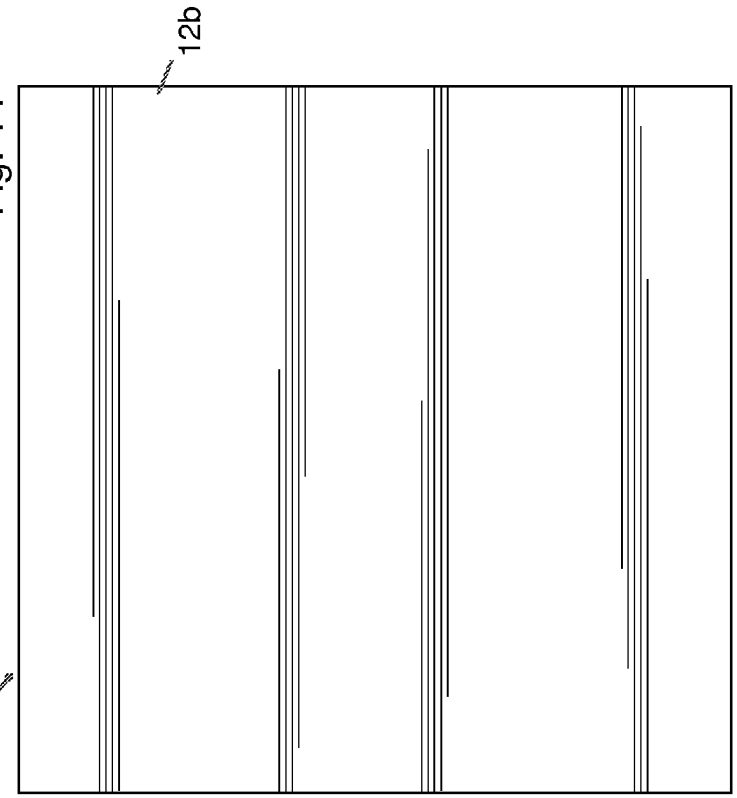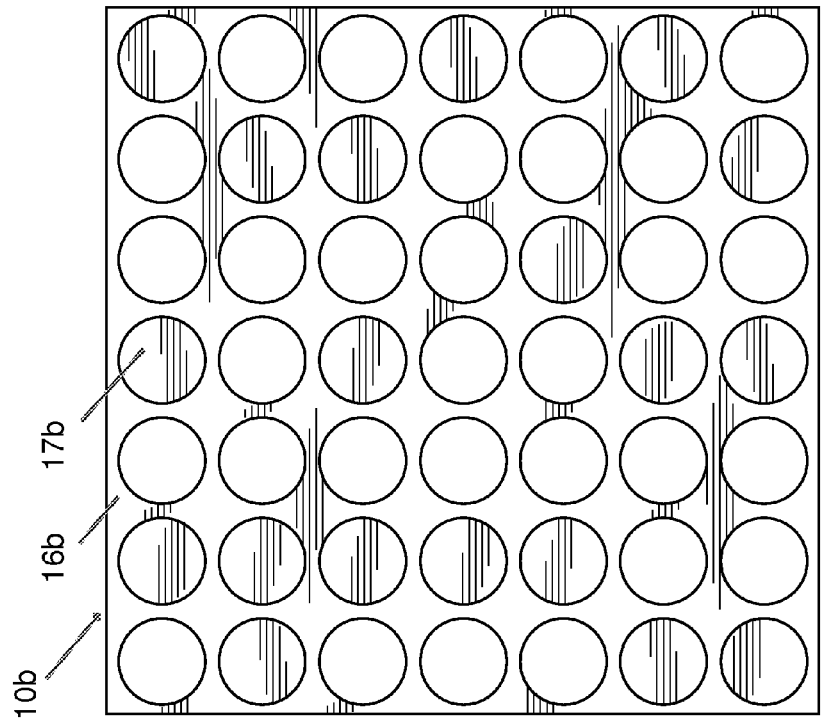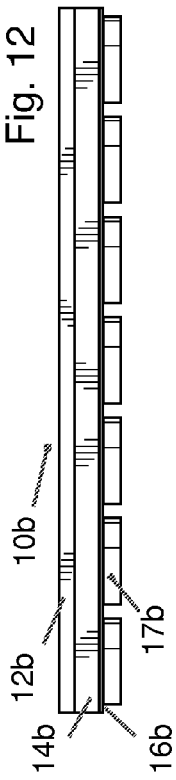

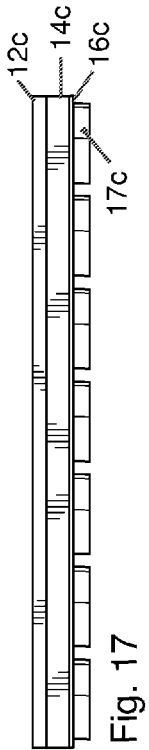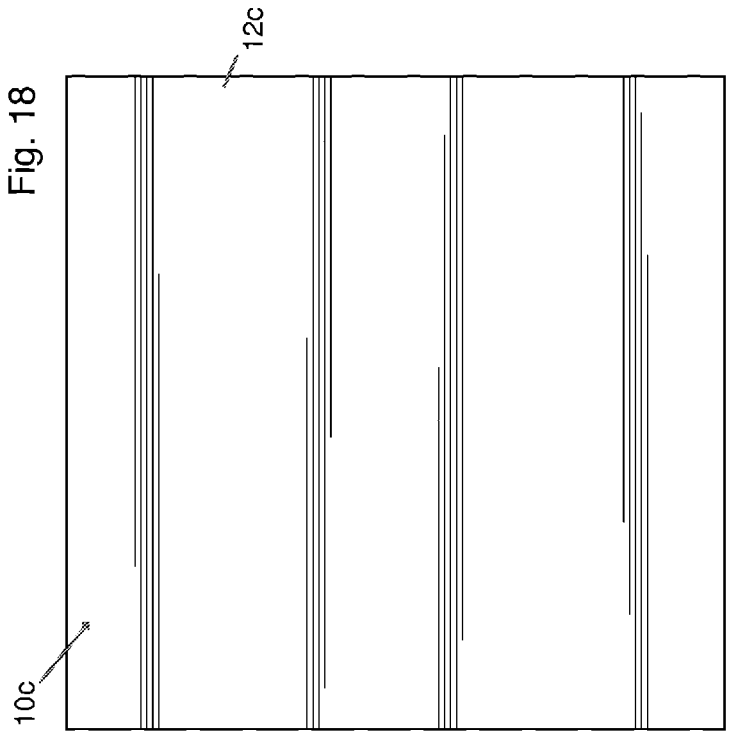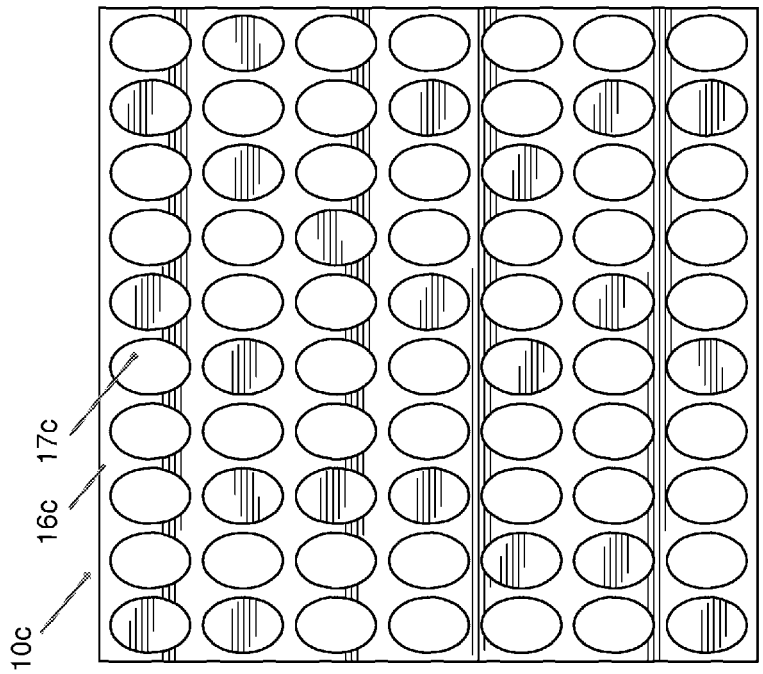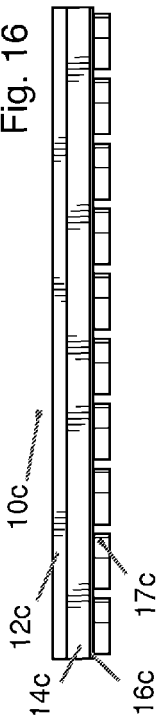

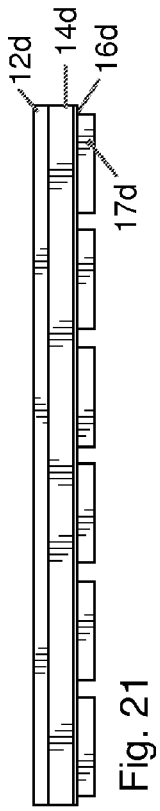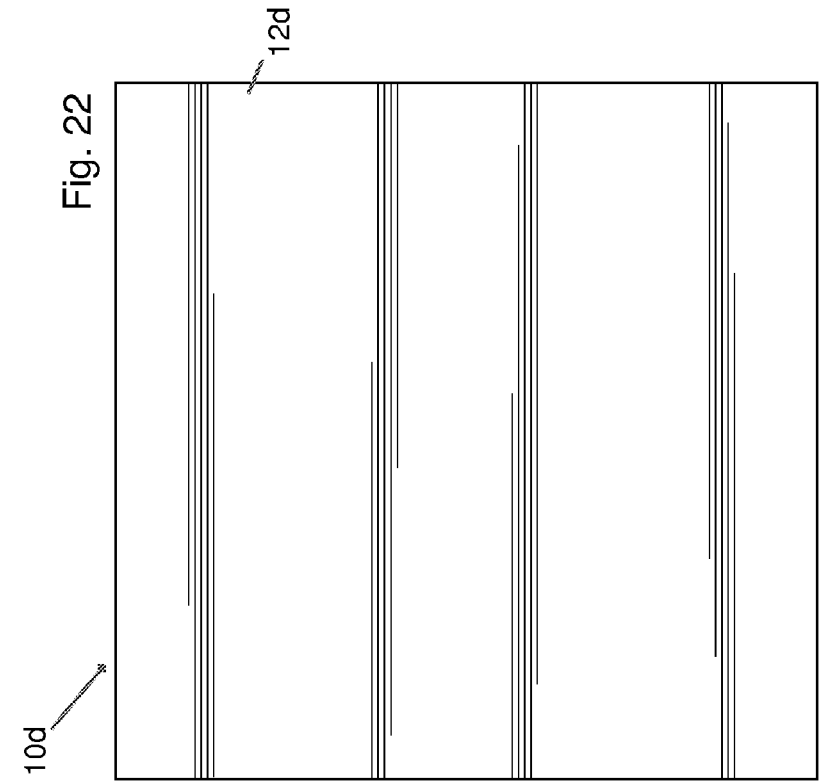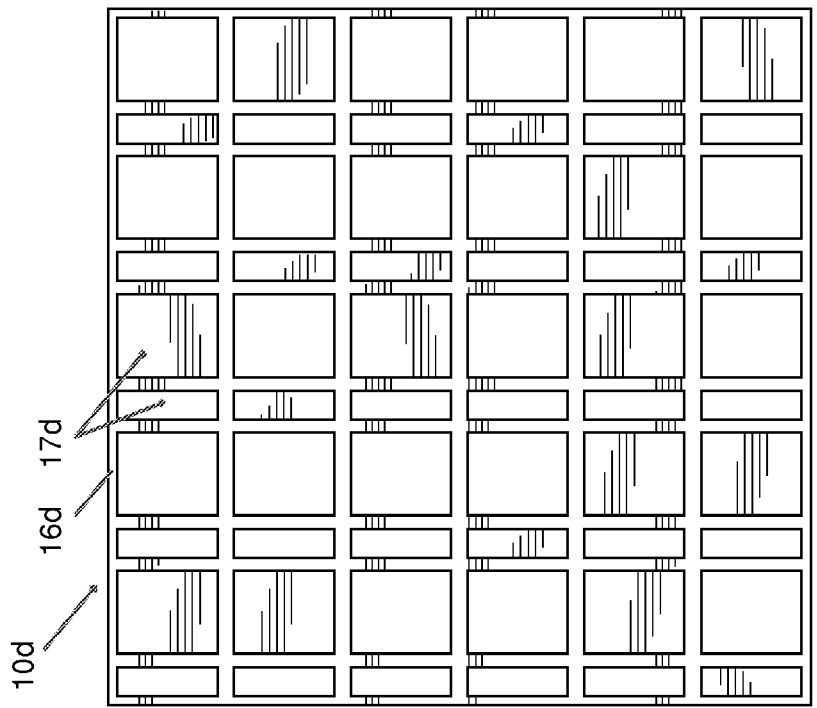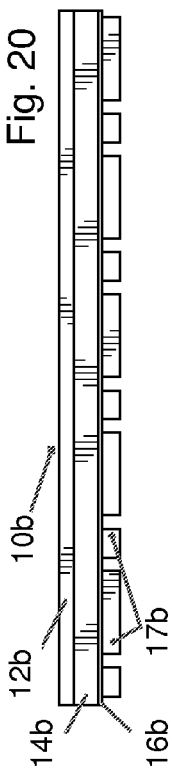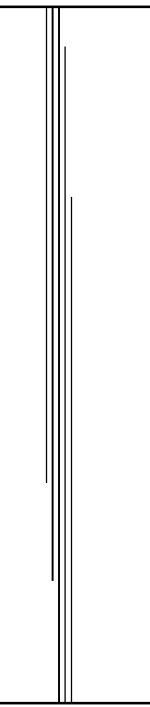

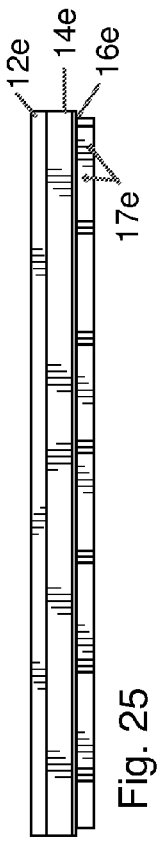
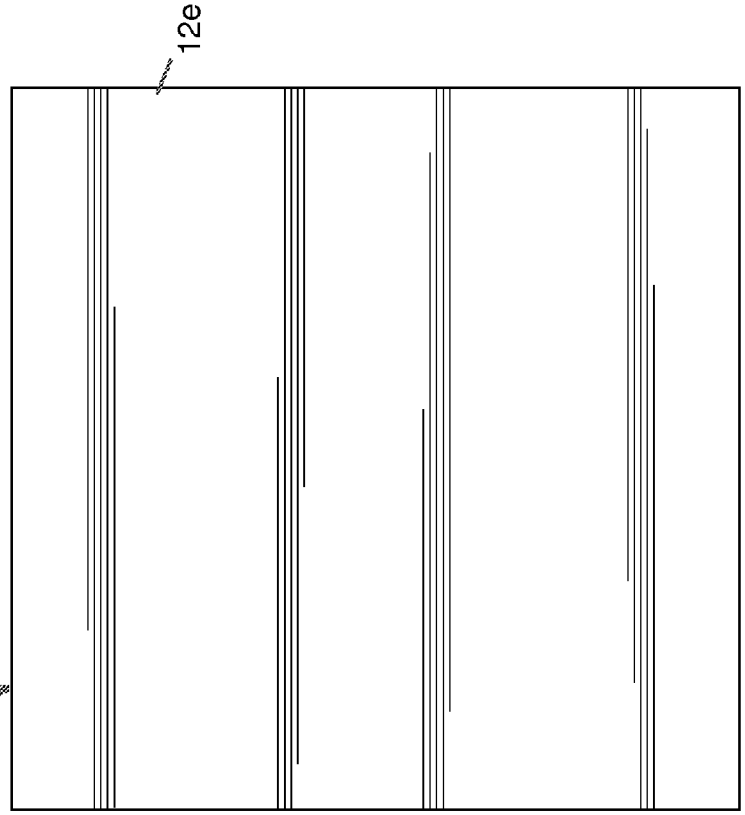
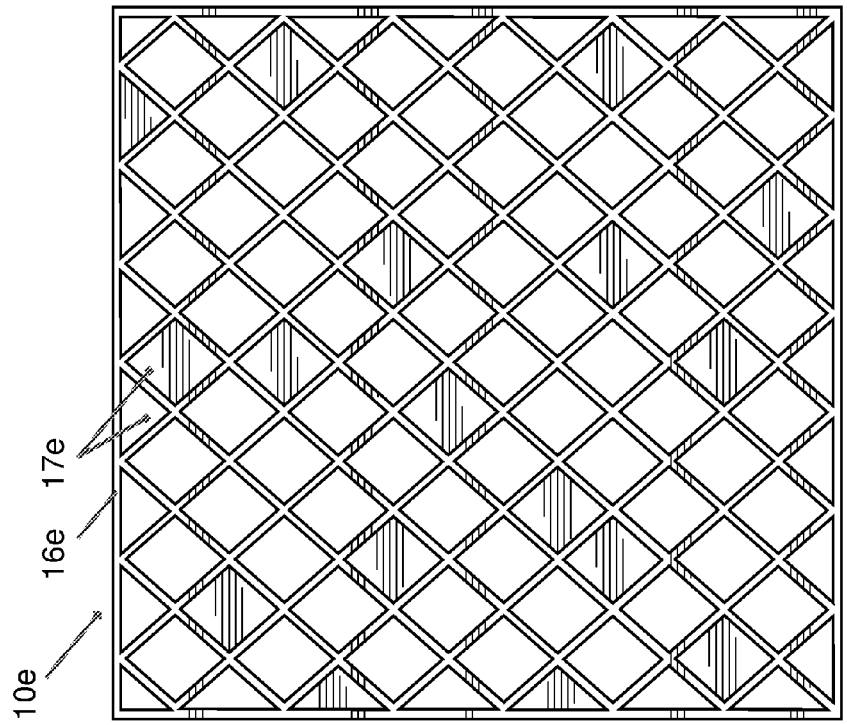
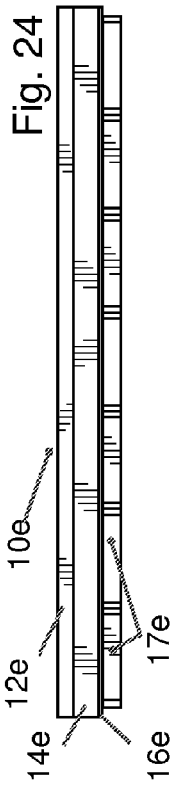

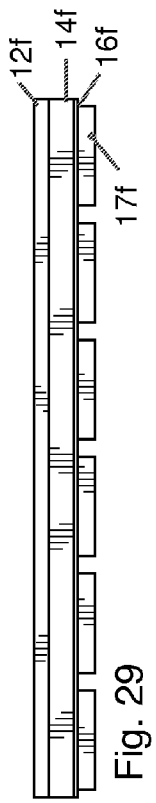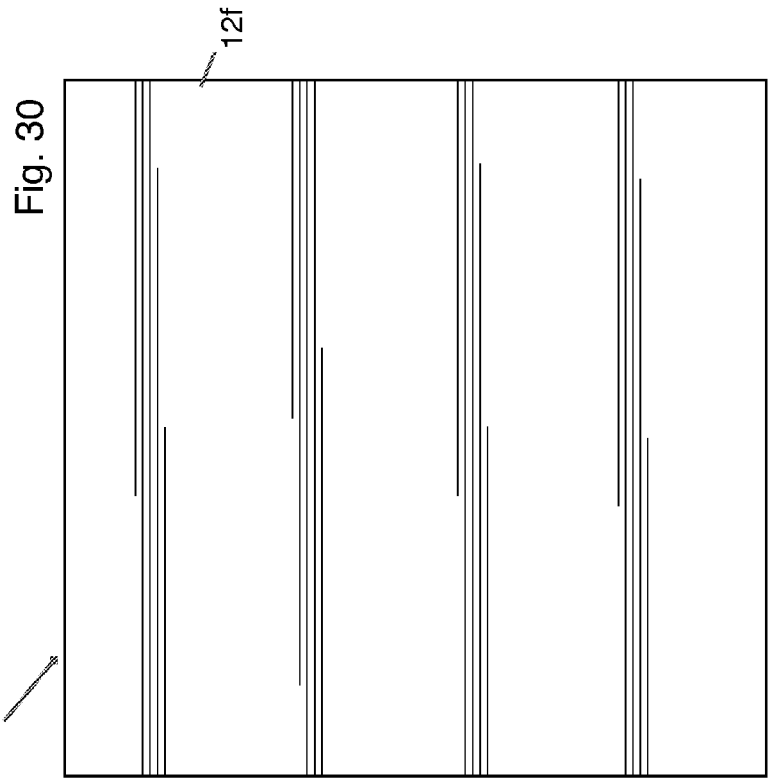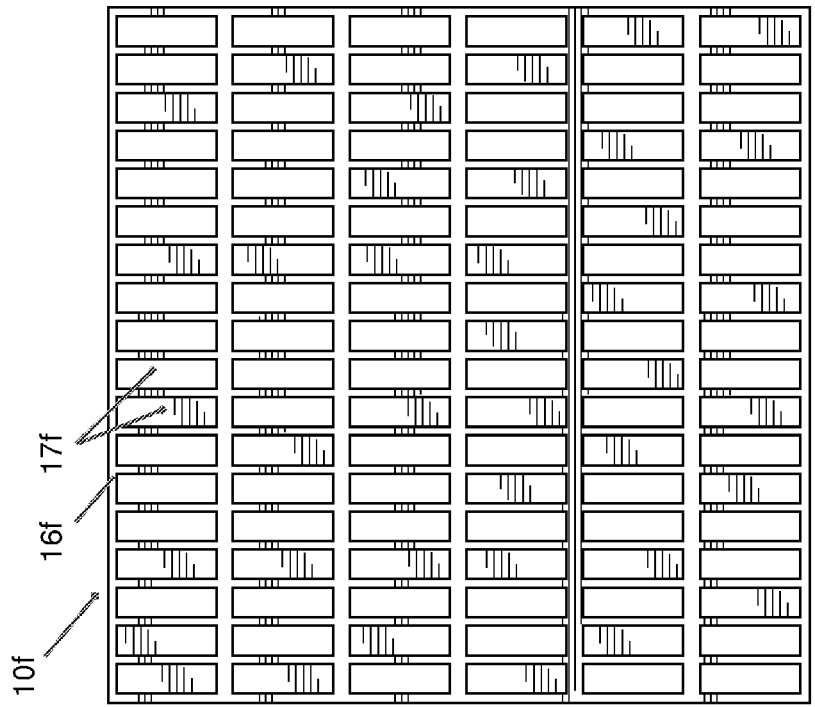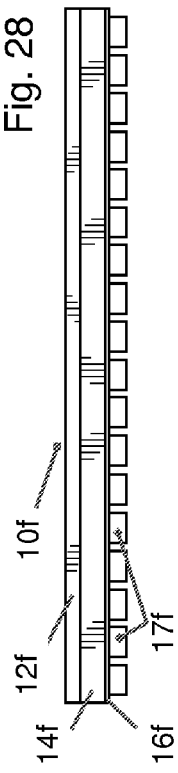

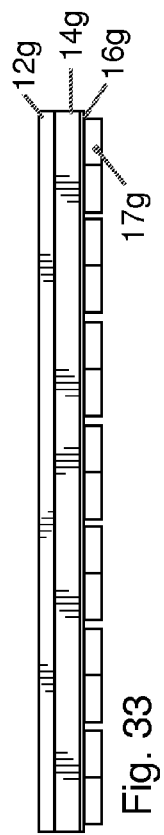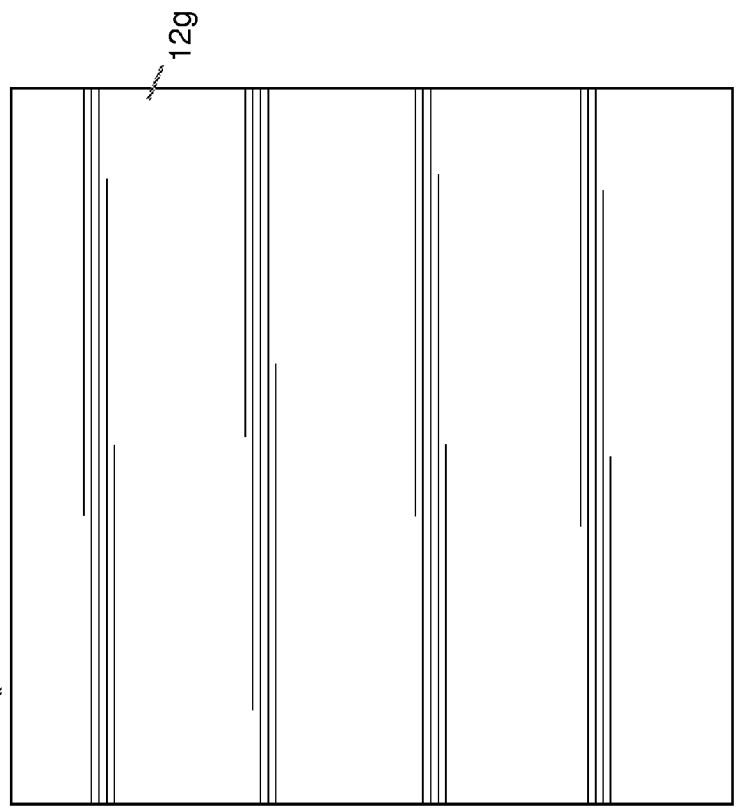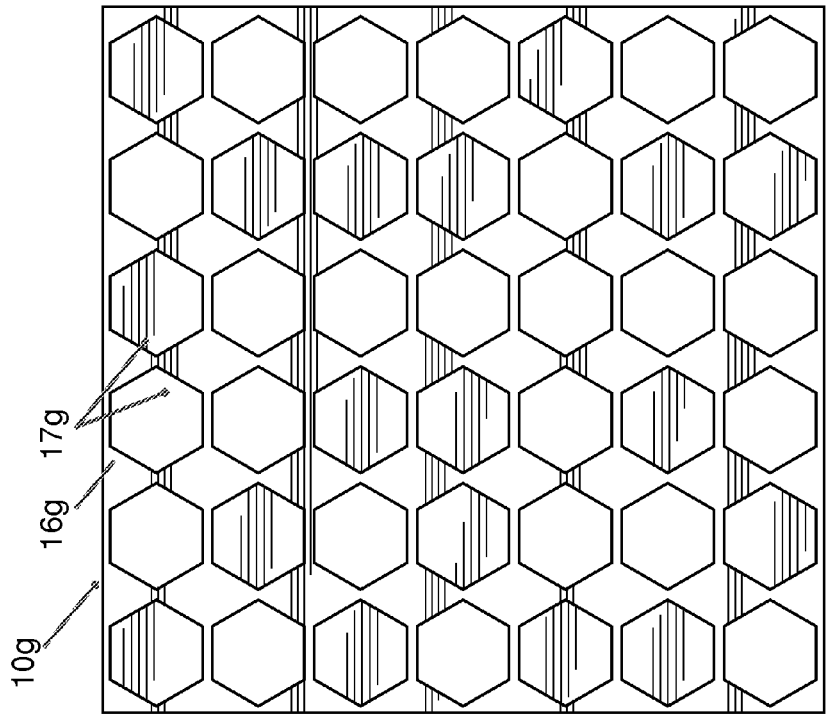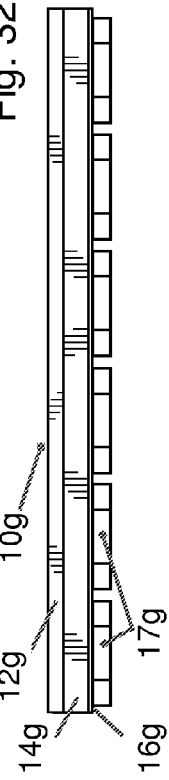

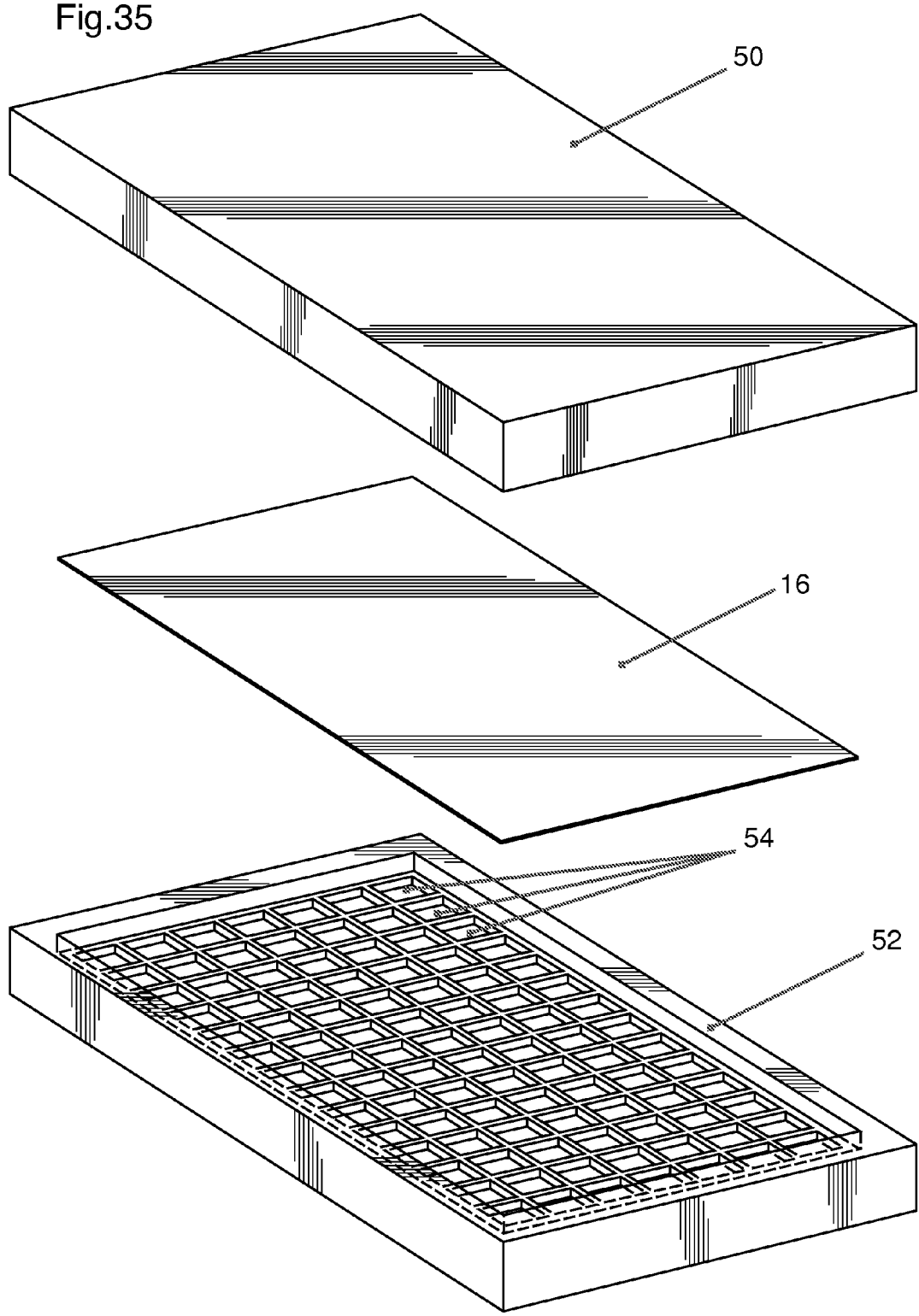

SUBFLOOR COMPONENT AND METHOD OF MANUFACTURING SAME

CROSS-REFERENCE TO RELATED APPLICATIONS

This application is a continuation-in-part of U.S. application Ser. No. 13/489,712 entitled "SUBFLOOR COMPONENT AND METHOD OF MANUFACTURING SAME" filed on Jun. 6, 2012, which is a continuation-in-part of U.S. application Ser. No. 13/412,038 entitled "SUBFLOOR COMPONENT AND METHOD OF MANUFACTURING SAME" filed on Mar. 5, 2012, the contents of which are incorporated herein by reference in their entireties.

FIELD OF THE INVENTION

The following is directed in general to building construction and renovation, and more particularly to a subfloor component and a method of manufacturing a subfloor component.

BACKGROUND OF THE INVENTION

A subfloor component is a panel or other component meant to be placed on top of a concrete floor or other foundation before a finished floor of, for example, hardwood or tile is installed. The subfloor component may have projections for permitting the flow of moisture underneath the component so as to prevent moisture from standing underneath the subfloor component and causing problems with mold. While subfloor components of varying types are known, improvements are desirable.

SUMMARY OF THE INVENTION

According to an aspect, there is provided a subfloor component comprising: an insulating rigid foam panel having first and second opposing faces and a plurality of intersecting grooves to define, in cross-section, a plurality of pedestals having at least one wall extending into the panel from the first face toward the second face; a film of substantially moisture-impervious material attached to the first face of the panel and that conforms to the tops and walls of the pedestals and to the bottoms of the grooves; and a hardboard layer on the second face of the panel.

The film may be fused to the panel.

The film may comprise material selected from the group comprising plastic or polymer. The plastic or polymer may be selected from the group consisting of: high-impact polystyrene, polyethylene, and ABS (Acrylonitrile Butadiene Styrene).

The film may be attached to at least one of: the tops of the pedestals, the walls of the pedestals, and the bottoms of the grooves. The film may be attached to at least two of: the tops of the pedestals, the walls of the pedestals, and the bottoms of the grooves.

Each of the plurality of pedestals may have a single wall. The pedestals may be shaped as circles or ellipses.

The panel may comprise expanded polystyrene (EPS).

The hardboard layer and the panel may be attached to each other with glue.

The intersecting grooves may be rectangular. The walls of the intersecting grooves may have a height of about 15 millimeters to about 20 millimeters. The width of the intersecting grooves may be about 15 millimeters to about 20 millimeters.

The pedestals may be shaped as at least one of circles, ellipses, rectangles, diamonds, squares, and hexagons.

The hardboard layer may comprise material selected from the group consisting of: OSB (oriented strand board), plywood, fiber cement board, cement board, metal sheeting, and magnesium oxide board.

The subfloor component may be shaped to connect to another subfloor component. The hardboard layer may comprise a tongue/groove configuration for connecting to another hardboard layer of another subfloor component.

The pedestals may be generally uniformly distributed across the first surface of the panel.

The hardboard layer may include a groove that is open along a side-facing surface of the hardboard layer, and the subfloor component may further comprise: a connector dimensioned to insert into the groove. The connector may comprise: a central body; and tongues extending outwards from the central body, wherein each tongue is dimensioned to be inserted into a respective groove in a hardboard layer of a subfloor component. Each tongue may be dimensioned to frictionally engage the interior of a respective groove. Barbs may extend from each wing for frictionally engaging the interior of a respective groove.

In another aspect, there is provided a method of manufacturing a subfloor component, comprising: providing a mold configured to form an insulating foam panel, the mold including pedestal-forming structures for forming the panel to have, in cross-section, a plurality of pedestals with walls that extend into the panel from a first face of the panel toward a second opposing face of the panel; placing a substantially moisture-impervious film into the mold adjacent to the pedestal-forming structures; placing heat-expandable beads into the mold against the film opposite the pedestal-forming structures; applying heat to the mold to expand the heat-expandable beads to form the panel, wherein the expansion of the heat-expandable beads causes both the film and the expanding beads to enter into and conform to the pedestal-forming structures thereby to form the pedestals of the panel with the film fused thereto; removing the panel with the fused film from the mold; and attaching a hardboard layer to the second face of the panel.

The heat-expandable beads may be expandable polystyrene (EPS) beads.

The film may comprise material selected from the group comprising plastic or polymer. The plastic or polymer may be selected from the group consisting of: high-impact polystyrene, polyethylene, and ABS (Acrylonitrile Butadiene Styrene).

Attaching the hardboard layer may comprise applying adhesive to one or both of the hardboard layer and the second face of the panel.

The hardboard layer may comprise material selected from the group consisting of: OSB (oriented strand board), plywood, fiber cement board, cement board, metal sheeting, and magnesium oxide board.

The method may further comprise: shaping the hardboard layer with a tongue/groove configuration for connecting to another hardboard layer of another subfloor component.

The method may further comprise: forming grooves on at least two sides of the hardboard layer, each groove for connecting to at least one connector. Each connector may be a connector strip comprising opposing tongues, the connector strip being configured for connecting adjacent subfloor components. The forming may comprise forming grooves on four sides of the hardboard layer.

In another aspect, there is provided a method of manufacturing a subfloor component, comprising: providing a mold configured to form an insulating foam panel, the mold including pedestal-forming structures for forming the panel to have, in cross-section, a plurality of pedestals with walls that extend into the panel from a first face of the panel toward a second opposing face of the panel; placing heat-expandable beads into the mold against the pedestal-forming structures; applying heat to the mold to expand the heat-expandable beads to form the panel, wherein the expansion of the heat-expandable beads causes the expanding beads to enter into and conform to the pedestal-forming structures thereby to form the pedestals of the panel; placing a substantially moisture-impervious film into the mold adjacent to the pedestal-forming structures; applying heat to the mold to fuse the film to the panel, the heat causing the film to enter into and conform to the pedestals and fuse thereto; removing the panel with the fused film from the mold; and attaching a hardboard layer to the second face of the panel.

The heat-expandable beads may be expandable polystyrene (EPS) beads.

The film may comprise material selected from the group comprising plastic or polymer. The plastic or polymer may be selected from the group consisting of: high-impact polystyrene, polyethylene, and ABS (Acrylonitrile Butadiene Styrene).

Attaching the hardboard layer may comprise applying adhesive to one or both of the hardboard layer and the second face of the panel.

The hardboard layer may comprise material selected from the group consisting of: OSB (oriented strand board), plywood, fiber cement board, cement board, metal sheeting, and magnesium oxide board.

The method may further comprise: shaping the hardboard layer with a tongue/groove configuration for connecting to another hardboard layer of another subfloor component.

The method may further comprise: forming grooves on at least two sides of the hardboard layer, each groove for connecting to at least one connector. Each connector may be a connector strip comprising opposing tongues, the connector strip being configured for connecting adjacent subfloor components.

The forming may comprise forming grooves on four sides of the hardboard layer.

In another aspect, there is provided a method of manufacturing a subfloor component, comprising: providing a mold configured to form an insulating foam panel, the mold including pedestal-forming structures for forming the panel to have, in cross-section, a plurality of pedestals with walls that extend into the panel from a first face of the panel toward a second opposing face of the panel; placing heat-expandable beads into the mold against the pedestal-forming structures; applying heat to the mold to expand the heat-expandable beads to form the panel, wherein the expansion of the heat-expandable beads causes the expanding beads to enter into and conform to the pedestal-forming structures thereby to form the pedestals of the panel; removing the panel from the mold; placing a substantially moisture-impervious film adjacent the first face of the panel; applying heat to one or both of the film and the panel, the heat causing the film to enter into and conform to the pedestals and fuse thereto; and attaching a hardboard layer to the second face of the panel.

Placing the substantially moisture-impervious film may comprise placing the film in contact with and/or in non-contact proximity with the first face of the panel.

The heat-expandable beads may be expandable polystyrene (EPS) beads.

The film may comprise material selected from the group comprising plastic or polymer. The plastic or polymer may be selected from the group consisting of: high-impact polystyrene, polyethylene, and ABS (Acrylonitrile Butadiene Styrene).

Attaching the hardboard layer may comprise applying adhesive to one or both of the hardboard layer and the second face of the panel.

The hardboard layer may comprise material selected from the group consisting of: OSB (oriented strand board), plywood, fiber cement board, cement board, metal sheeting, and magnesium oxide board.

The method may further comprise: shaping the hardboard layer with a tongue/groove configuration for connecting to another hardboard layer of another subfloor component.

The method may further comprise: forming grooves on at least two sides of the hardboard layer, each groove for connecting to at least one connector. Each connector may be a connector strip comprising opposing tongues, the connector strip being configured for connecting adjacent subfloor components. The forming may comprise forming grooves on four sides of the hardboard layer.

BRIEF DESCRIPTION OF THE DRAWINGS

A detailed description of the preferred embodiment is set forth in detail below, with reference to the following drawings, in which:

FIG. 1 is a perspective view of the underside of one embodiment of a subfloor component;

FIG. 2 is a bottom view of the subfloor component of FIG. 1;

FIG. 3 is a side view of the subfloor component of FIG. 1;

FIG. 4 is an end view of the subfloor component of FIG. 1;

FIG. 7 is a bottom view of the subfloor component of FIG. 6;

FIG. 8 is a side view of the subfloor component of FIG. 6;

FIG. 9 is an end view of the subfloor component of FIG. 6;

FIG. 10 is a top view of the subfloor component of FIG. 6;

FIG. 11 is a bottom view of another embodiment of a subfloor component;

FIG. 12 is a side view of the subfloor component of FIG. 11;

FIG. 13 is an end view of the subfloor component of FIG. 11;

FIG. 14 is a top view of the subfloor component of FIG. 11;

FIG. 15 is a bottom view of another embodiment of a subfloor component;

FIG. 16 is a side view of the subfloor component of FIG. 15;

FIG. 17 is an end view of the subfloor component of FIG. 15;

FIG. 18 is a top view of the subfloor component of FIG. 15;

FIG. 19 is a bottom view of another embodiment of a subfloor component;

FIG. 20 is a side view of the subfloor component of FIG. 19;

FIG. 21 is an end view of the subfloor component of FIG. 19;

FIG. 22 is a top view of the subfloor component of FIG. 19;

FIG. 23 is a bottom view of another embodiment of a subfloor component;

FIG. 24 is a side view of the subfloor component of FIG. 22;

FIG. 25 is an end view of the subfloor component of FIG. 22;

FIG. 26 is a top view of the subfloor component of FIG. 22;

FIG. 27 is a bottom view of another embodiment of a subfloor component;

FIG. 28 is a side view of the subfloor component of FIG. 27;

FIG. 29 is an end view of the subfloor component of FIG. 28;

FIG. 30 is a top view of the subfloor component of FIG. 29;

FIG. 31 is a bottom view of another embodiment of a subfloor component;

FIG. 32 is a side view of the subfloor component of FIG. 31;

FIG. 33 is an end view of the subfloor component of FIG. 31;

FIG. 34 is a top view of the subfloor component of FIG. 31;

FIG. 35 is a perspective view of a moisture-resistant film layer being placed against pedestal-forming structures that are within one of the components of a mold structure during manufacture of the subfloor component of FIG. 1;

DETAILED DESCRIPTION OF THE PREFERRED EMBODIMENT

Figure 5:
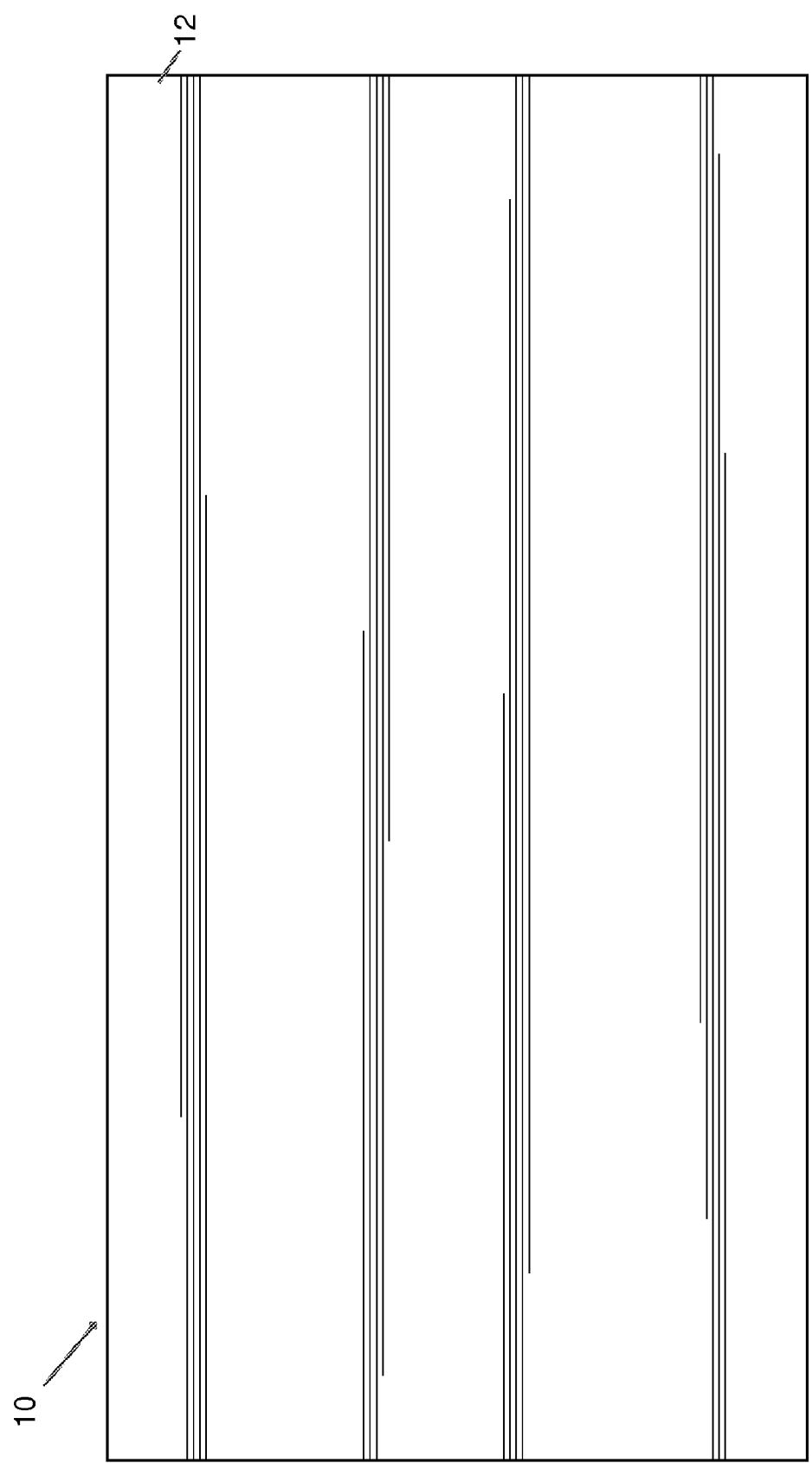
FIG. 5 is a top view of the subfloor component of FIG. 1.
Figure 6:
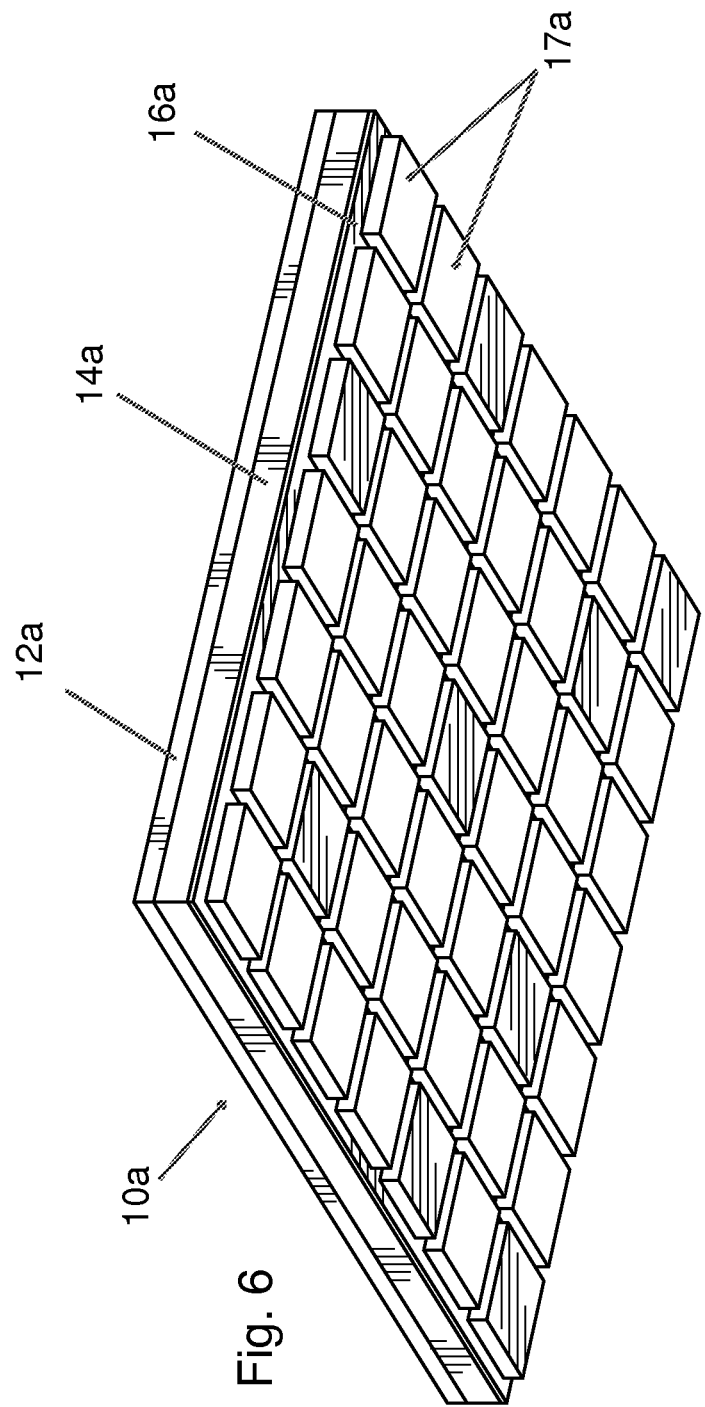
FIG. 6 is a perspective view of the underside of another embodiment of a subfloor component.

In FIGS. 1 through 5, there is shown a subfloor component 10 according to an embodiment. Subfloor component 10 is rectangular in shape, and includes a hardboard panel 12, an insulating foam panel 14, and a moisture-resistant film 16. The insulating foam panel 14 includes first and second opposing faces. Multiple intersecting grooves in the first face define, in cross-section, multiple pedestals 17 that have walls that extend into the insulating foam panel 14 from the first face toward the second face. The moisture-resistant film 16 is attached to the first face of the panel and conforms to the pedestals 17. The hardboard layer 12 is on the second face of the panel, which is opposite the panel 14 from the first face.

In this embodiment, the hardboard panel 12 is oriented strand board (OSB), a material well-known to be employed in building construction. Also in this embodiment, the insulating foam panel 14 is formed of expanded polystyrene (EPS), and the hardboard panel 12 is glued to the insulating foam panel 14. Furthermore, in this embodiment the moisture-resistant film 16 is a thin layer of high-impact polystyrene.

In this embodiment, the moisture-resistant film 16 is fused to the insulating foam panel 14 such that the moisture-resistant film 16 is affixed to the top and wall of the pedestals 17 as well as to the bottom of the grooves. The subfloor component 10 is to be placed on a foundation floor or other such structure with the pedestals 17 downwards and with the moisture-resistant film 16 between the insulating foam layer 14 and the foundation floor. Moisture on the foundation floor is able to pass between the pedestals 17 and can contact the moisture-resistant film 16 in order to drain away from underneath the subfloor component 10. The moisture-resistant film layer 16 effectively resists the passage of moisture into the insulating foam panel 14 from the foundation floor thereby keeping the insulating foam panel 14 suitably dry. Thus, it will be understood that the moisture-resistant film layer 16 is substantially moisture-impervious, meaning that the moisture-resistant film layer 16 permits only an insignificant amount of moisture, if any, to pass therethrough.

The fusing of the moisture-resistant film 16 and the insulating foam panel 14 enables the pedestals 17 to which the moisture-resistant film is conforming to have increased resistance to breakage. As would be understood, as useful as expanded EPS is for insulation, it can be brittle. In this embodiment, the pedestals 17, which are shaped as squares, each have four (4) walls meeting at four (4) edges and four (4) top corners. Particularly the top corners and also the edges are most prone to being broken away during transportation, installation, or usage. The present inventor has discovered that, particularly for a subfloor component 10 that will be experiencing various physical pressures from above, advantages are gained by employing a moisture-resistant film 16 that not only resists moisture reaching the insulating foam panel 16 but conforms to the pedestals in order to provide drainage and also increase the structural integrity of the pedestals 17. In this way, physical pressures both during construction (workers, wheel barrows, other machinery) and when construction is complete (home owners, employees, couches, filing cabinets etc.) can be better withstood by the pedestals 17.

In this embodiment, the walls of the intersecting grooves have a height of about 15 millimeters, giving the pedestals 17 a corresponding height. However, other heights are possible. For example, other embodiments may provide heights of between about 15 millimeters to about 20 millimeters. Furthermore, in this embodiment, the intersecting grooves have a width of about 15 millimeters, giving the pedestals 17 a corresponding spacing. However, other widths are possible. For example, other embodiments may provide widths of between about 15 millimeters to about 20 millimeters. It will be understood that having all grooves have the same width is not required.

While the above-described subfloor component 10 can be useful for many purposes, the present inventor has also developed additional embodiments. For example, FIGS. 6 through 10 show a subfloor component 10a according to another embodiment. Subfloor component 10a is square in shape, and includes a hardboard panel 12a, an insulating foam panel 14a, and a moisture-resistant film 16a. Like the embodiment described in FIGS. 1 through 5, the insulating foam panel 14a includes first and second opposing faces. Multiple intersecting grooves in the first face define, in cross-section, multiple pedestals 17a that have walls that extend into the insulating foam panel 14a from the first face toward the second face. The moisture-resistant film 16a is attached to the first face of the panel and conforms to the pedestals 17a. The hardboard layer 12a is on the second face of the panel, which is opposite the panel 14a from the first face. As can be seen, subfloor component 10a is similar to subfloor component 10, but is square instead of rectangular.

FIGS. 11 through 14 show a subfloor component 10b according to another embodiment. Subfloor component 10b is square in shape, and includes a hardboard panel 12b, an insulating foam panel 14b, and a moisture-resistant film 16b. Like the embodiment described in FIGS. 1 through 5, the insulating foam panel 14b includes first and second opposing faces. Multiple intersecting grooves in the first face define, in cross-section, multiple pedestals 17b that have walls that extend into the insulating foam panel 14b from the first face toward the second face. The moisture-resistant film 16b is attached to the first face of the panel and conforms to the pedestals 17b. The hardboard layer 12b is on the second face of the panel, which is opposite the panel 14b from the first face. As can be seen, subfloor component 10b is similar to subfloor component 10, but is square instead of rectangular. Furthermore, each of the pedestals 17b are circular, rather than square. The pedestals 17b being circular means that each pedestal 17b only has one wall, and thus there are no top corners. Because pedestal 17b does not have any top corners, the breakage due to handling or use of the subfloor component 10b is even less likely.

FIGS. 15 through 18 show a subfloor component 10c according to another embodiment. Subfloor component 10c is square in shape, and includes a hardboard panel 12c, an insulating foam panel 14c, and a moisture-resistant film 16c. Like the embodiment described in FIGS. 1 through 5, the insulating foam panel 14c includes first and second opposing faces. Multiple intersecting grooves in the first face define, in cross-section, multiple pedestals 17c that have walls that extend into the insulating foam panel 14c from the first face toward the second face. The moisture-resistant film 16c is attached to the first face of the panel and conforms to the pedestals 17c. The hardboard layer 12c is on the second face of the panel, which is opposite the panel 14c from the first face. As can be seen, subfloor component 10c is similar to subfloor component 10, but is square instead of rectangular. Furthermore, each of the pedestals 17c are oval-shaped, rather than square. The pedestals 17c being oval-shaped means that each pedestal 17c only has one wall, and thus there are no top corners. Because pedestal 17c does not have any top corners, breakage due to handling or use of the subfloor component 10c is less likely.

FIGS. 19 through 22 show a subfloor component 10d according to another embodiment. Subfloor component 10d is square in shape, and includes a hardboard panel 12d, an insulating foam panel 14d, and a moisture-resistant film 16d. Like the embodiment described in FIGS. 1 through 5, the insulating foam panel 14d includes first and second opposing faces. Multiple intersecting grooves in the first face define, in cross-section, multiple pedestals 17d that have walls that extend into the insulating foam panel 14d from the first face toward the second face. The moisture-resistant film 16d is attached to the first face of the panel and conforms to the pedestals 17d. The hardboard layer 12a is on the second face of the panel, which is opposite the panel 14d from the first face. As can be seen, subfloor component 10d is similar to subfloor component 10, but is square instead of rectangular. Furthermore, there are two different sizes of pedestals 17d, namely a thin rectangle and a thick rectangle.

FIGS. 23 through 26 show a subfloor component 10d according to another embodiment. Subfloor component 10e is square in shape, and includes a hardboard panel 12e, an insulating foam panel 14e, and a moisture-resistant film 16e. Like the embodiment described in FIGS. 1 through 5, the insulating foam panel 14e includes first and second opposing faces. Multiple intersecting grooves in the first face define, in cross-section, multiple pedestals 17e that have walls that extend into the insulating foam panel 14e from the first face toward the second face. The moisture-resistant film 16e is attached to the first face of the panel and conforms to the pedestals 17e. The hardboard layer 12e is on the second face of the panel, which is opposite the panel 14e from the first face. As can be seen, subfloor component 10e is similar to subfloor component 10, but is square instead of rectangular. Furthermore, the pedestals 17e are diamond-shaped.

FIGS. 27 through 30 show a subfloor component 10f according to another embodiment. Subfloor component 10f is square in shape, and includes a hardboard panel 12f, an insulating foam panel 14f, and a moisture-resistant film 16f. Like the embodiment described in FIGS. 1 through 5, the insulating foam panel 14f includes first and second opposing faces. Multiple intersecting grooves in the first face define, in cross-section, multiple pedestals 17f that have walls that extend into the insulating foam panel 14f from the first face toward the second face. The moisture-resistant film 16f is attached to the first face of the panel and conforms to the pedestals 17f The hardboard layer 12f is on the second face of the panel, which is opposite the panel 14f from the first face. As can be seen, subfloor component 10f is similar to subfloor component 10, but is square instead of rectangular. Furthermore, the pedestals 17f are all rectangles.

FIGS. 31 through 34 show a subfloor component 10g according to another embodiment. Subfloor component 10g is square in shape, and includes a hardboard panel 12g, an insulating foam panel 14g, and a moisture-resistant film 16g. Like the embodiment described in FIGS. 1 through 5, the insulating foam panel 14g includes first and second opposing faces. Multiple intersecting grooves in the first face define, in cross-section, multiple pedestals 17g that have walls that extend into the insulating foam panel 14g from the first face toward the second face. The moisture-resistant film 16g is attached to the first face of the panel and conforms to the pedestals 17g. The hardboard layer 12g is on the second face of the panel, which is opposite the panel 14g from the first face. As can be seen, subfloor component 10g is similar to subfloor component 10, but is square instead of rectangular. Furthermore, the pedestals 17g are all hexagons.

It will be understood that a subfloor component with pedestals of different shapes, including others not disclosed above, or mixtures of differently-shaped pedestals such as those described above, may be provided.

The various subfloor components described herein may generally be used alongside each other in a particular installation, provided that the overall thicknesses of two different panels are similar, and provided that using differently-shaped pedestals in two different subfloor components does not unduly impede the flow of moisture beneath the subfloor components. In one embodiment, subfloor components have tongue and groove configurations along the edges which abut against each other, such that the tongue of one panel can be received within the groove of the adjacent panel. The tongues/grooves may have square, rectangular configurations with or without rounded distal corners. The tongue and groove configuration may be formed prior to, or after, attaching the hardboard panel to the insulating foam panel.

Figure 40:
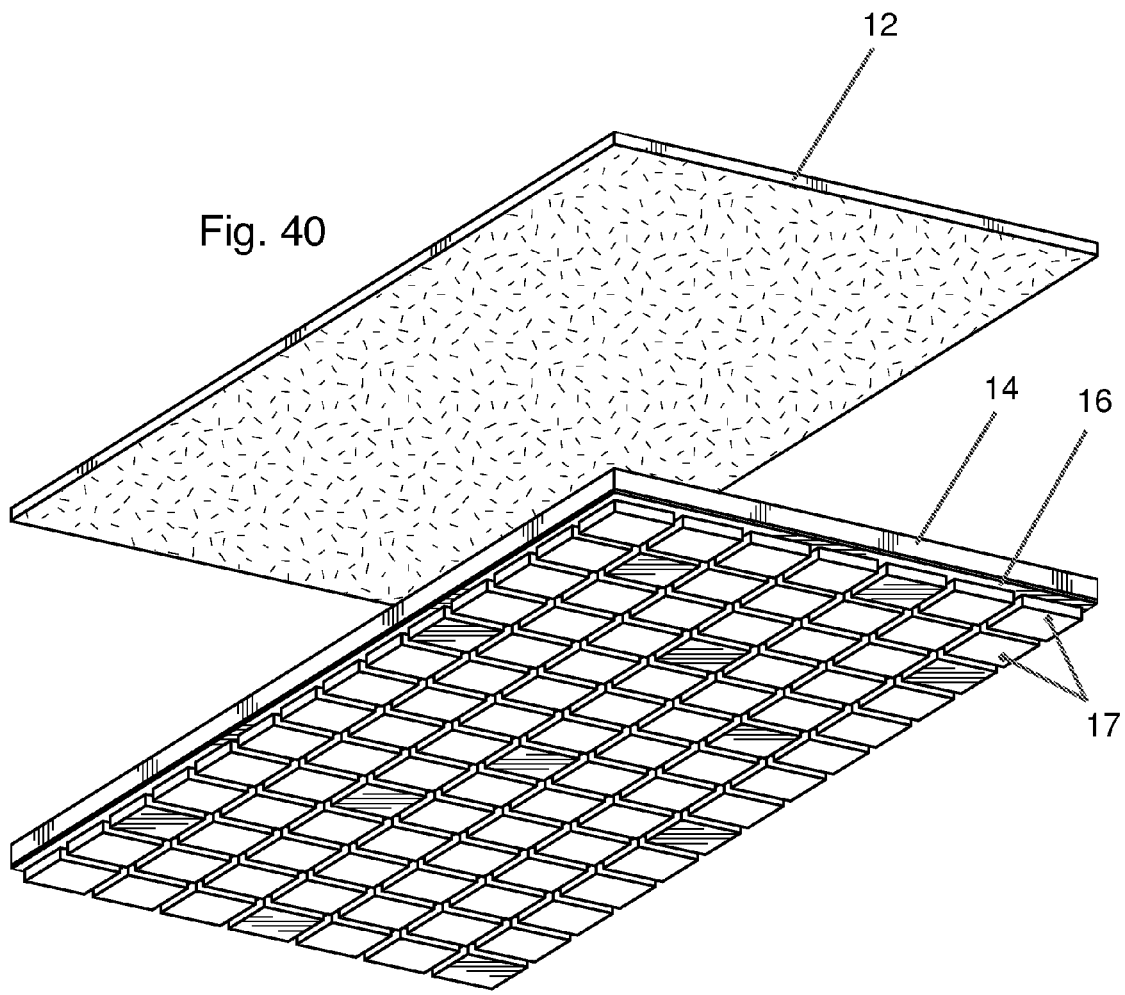
FIG. 40 is a perspective view of the hardboard layer being aligned with the face of the insulating foam panel that is opposite to the panel's pedestals.
Figure 41:
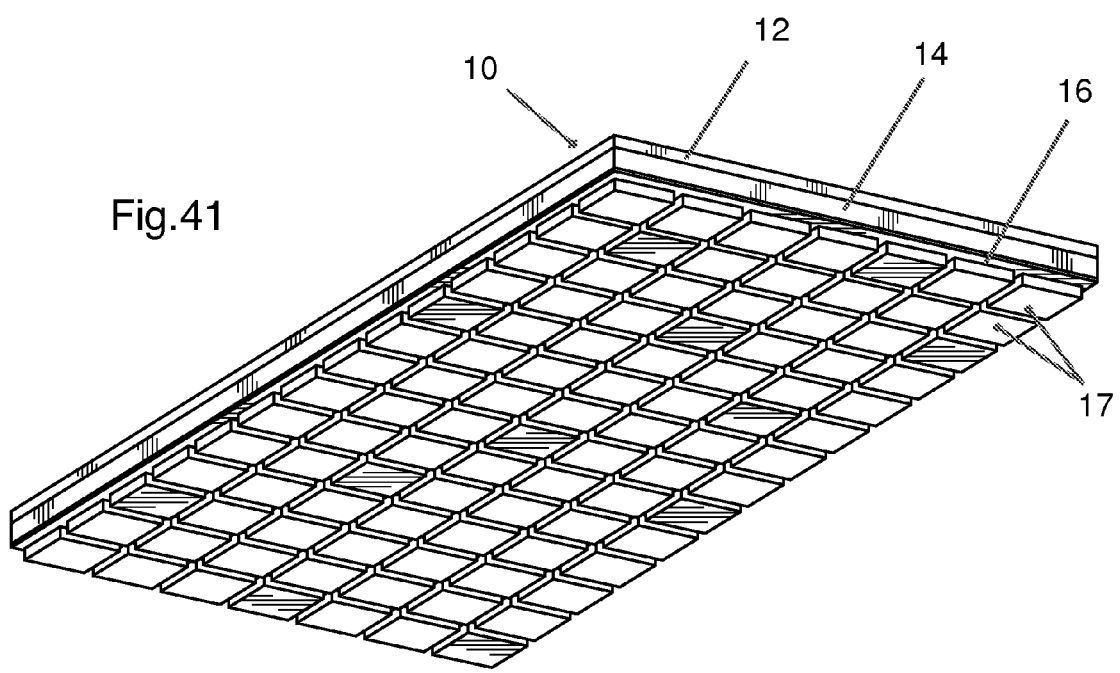
FIG. 41 is a perspective view of the subfloor component having been formed.
Figure 42:
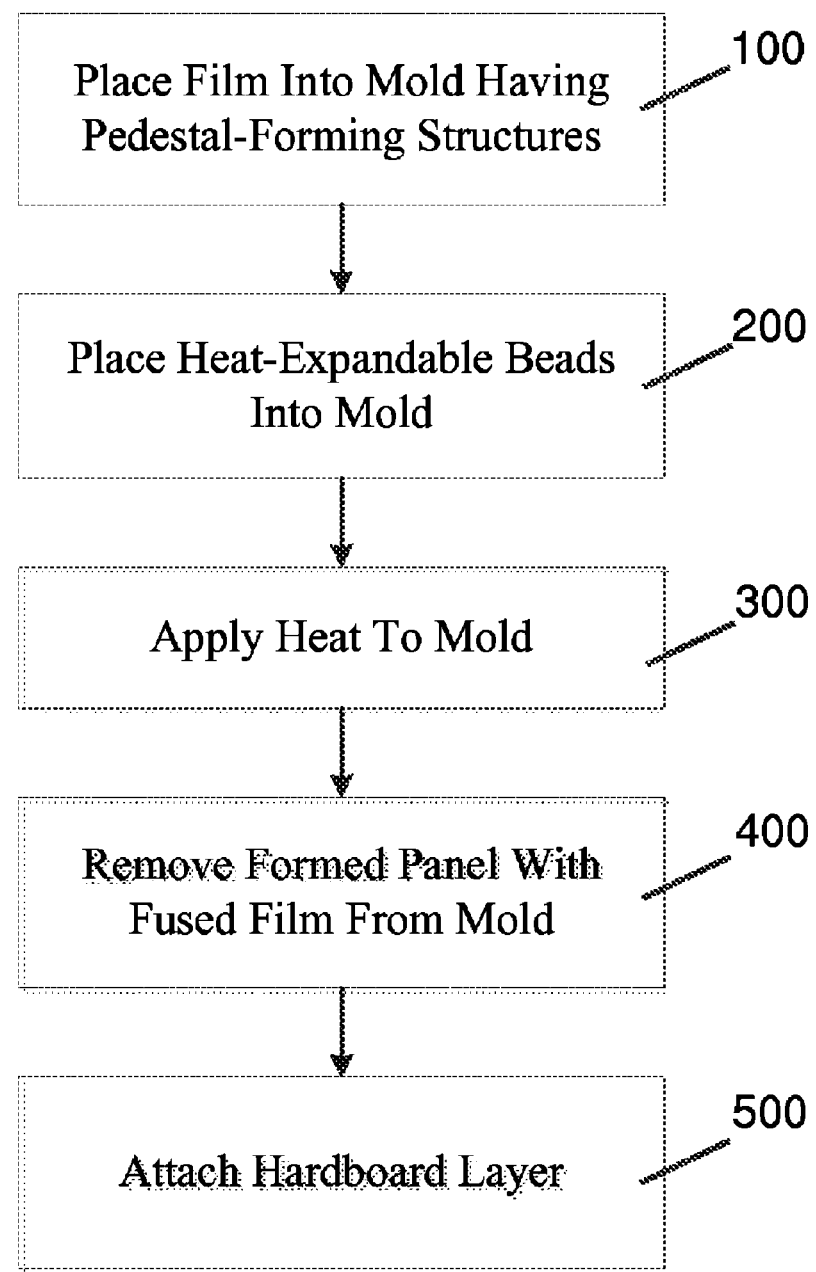
FIG. 42 is a flowchart of steps for manufacturing a subfloor component.

FIG. 42 shows a flowchart of steps of a method of manufacturing a subfloor component such as subfloor component 10 described above. The treatment of the materials involved in the steps are illustrated in FIGS. 35 through 41. In FIG. 35, a mold structure is shown have a top portion 50 and a bottom portion 52. It will be understood that the terms top and bottom may be interchanged with left and right, for example, in the case of a mold structure that stands vertically.

Figure 36:
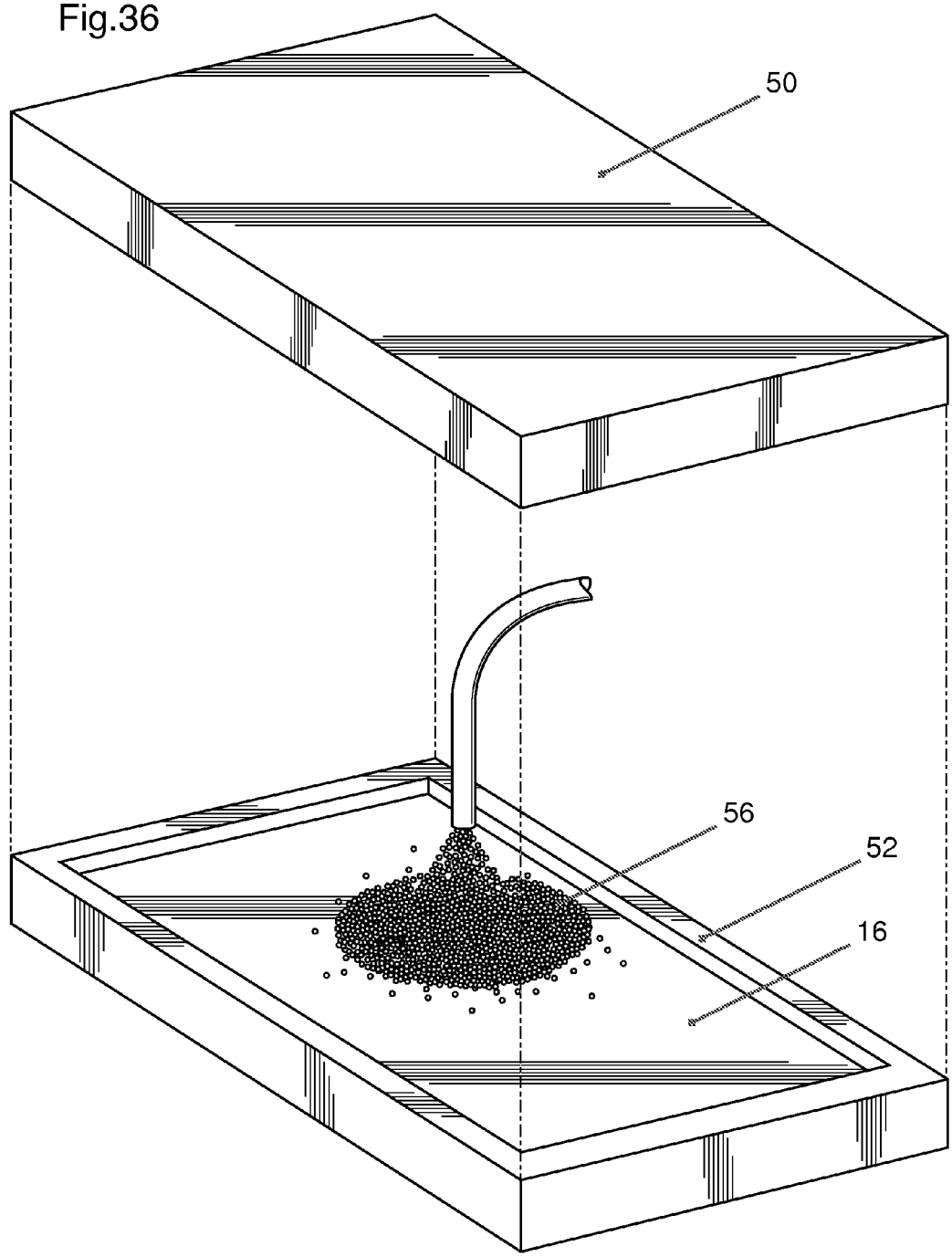
FIG. 36 is a perspective view of expandable polystyrene beads being poured into the mold structure atop the moisture-resistant film layer.
Figure 37:
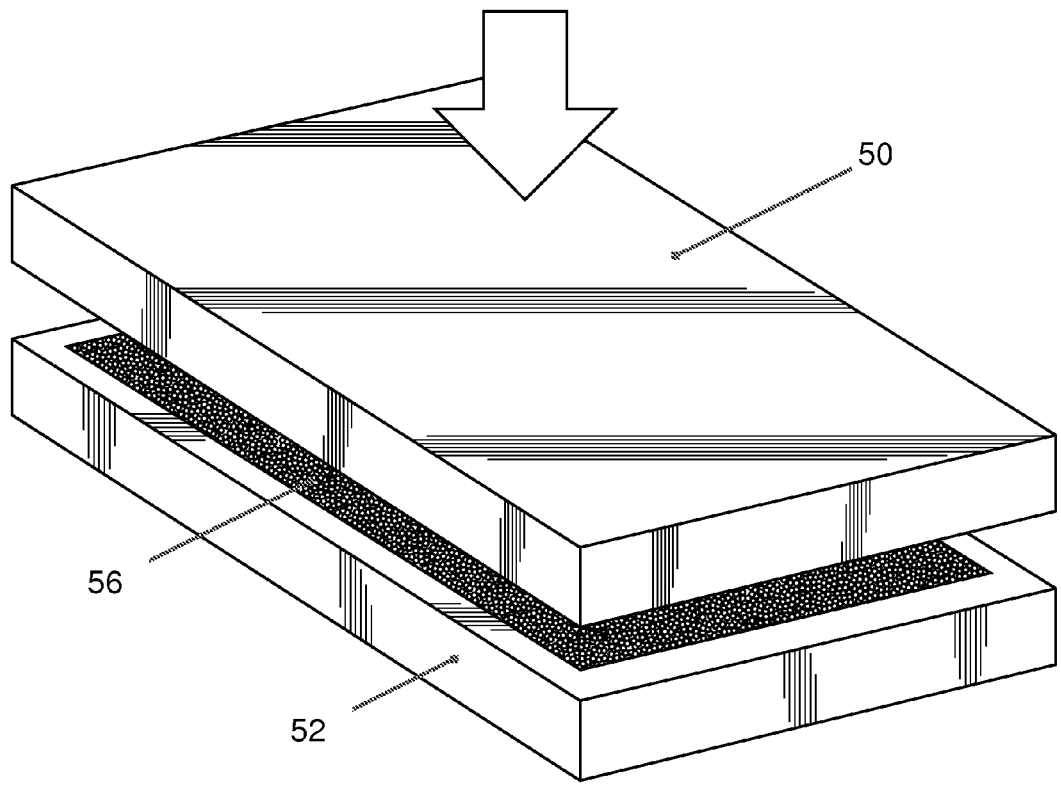
FIG. 37 is a perspective view of a mold structure being closed prior to applying heat to the mold.
Figure 38:
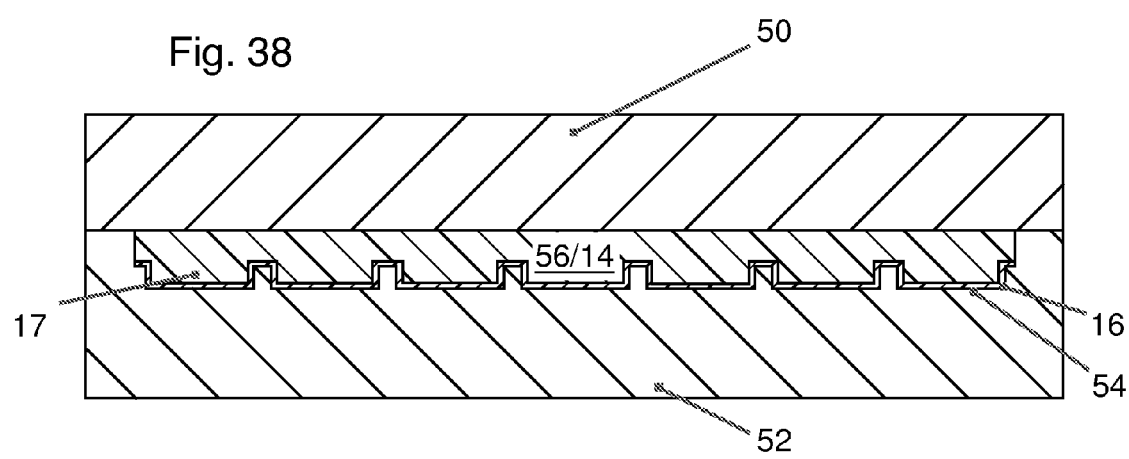
FIG. 38 is a cutaway view of the end of the mold structure enclosing the moisture-resistant film layer and the expandable polystyrene beads while the mold structure is being heated.

First, a generally-flat piece of moisture-resistant film 16 is placed within the bottom portion 52 of the mold structure on top of and therefore adjacent to pedestal-forming structures 54 (step 100), as shown in FIG. 35. The pedestal forming structures 52 are part of the mold structure and have a shape corresponding to the shape of the desired pedestals 17. With the moisture-resistant film 16 adjacent to the pedestal-forming structures 54, heat-expandable beads 56 are then placed into the mold structure on top of the moisture-resistant film 16 (step 200), as shown in FIG. 36. The heat-expandable beads are thus placed against a side of the moisture-resistant film 16 that is opposite the pedestal forming structures 54. As shown in FIG. 37, with the moisture-resistant film 16 and the heat-expandable beads 56 within the mold structure between top 50 and bottom 52 portions, the mold structure is then closed. At this point, heat is then applied to the mold structure (step 300) so as to cause the heat-expandable beads 56 to expand and fuse together. While the heat-expandable beads 56 are expanding to form the insulating foam panel 14, the pressure of the expansion causes both the moisture-resistant film 16 and the expanding beads 56 to enter into and conform to the pedestal-forming structures 54, as shown in the cutaway view of FIG. 38. The moisture-resistant film being of high-impact polystyrene fuses at its surface under the applied heat to the facing surface of the insulating foam panel 14 being formed.

Figure 39:
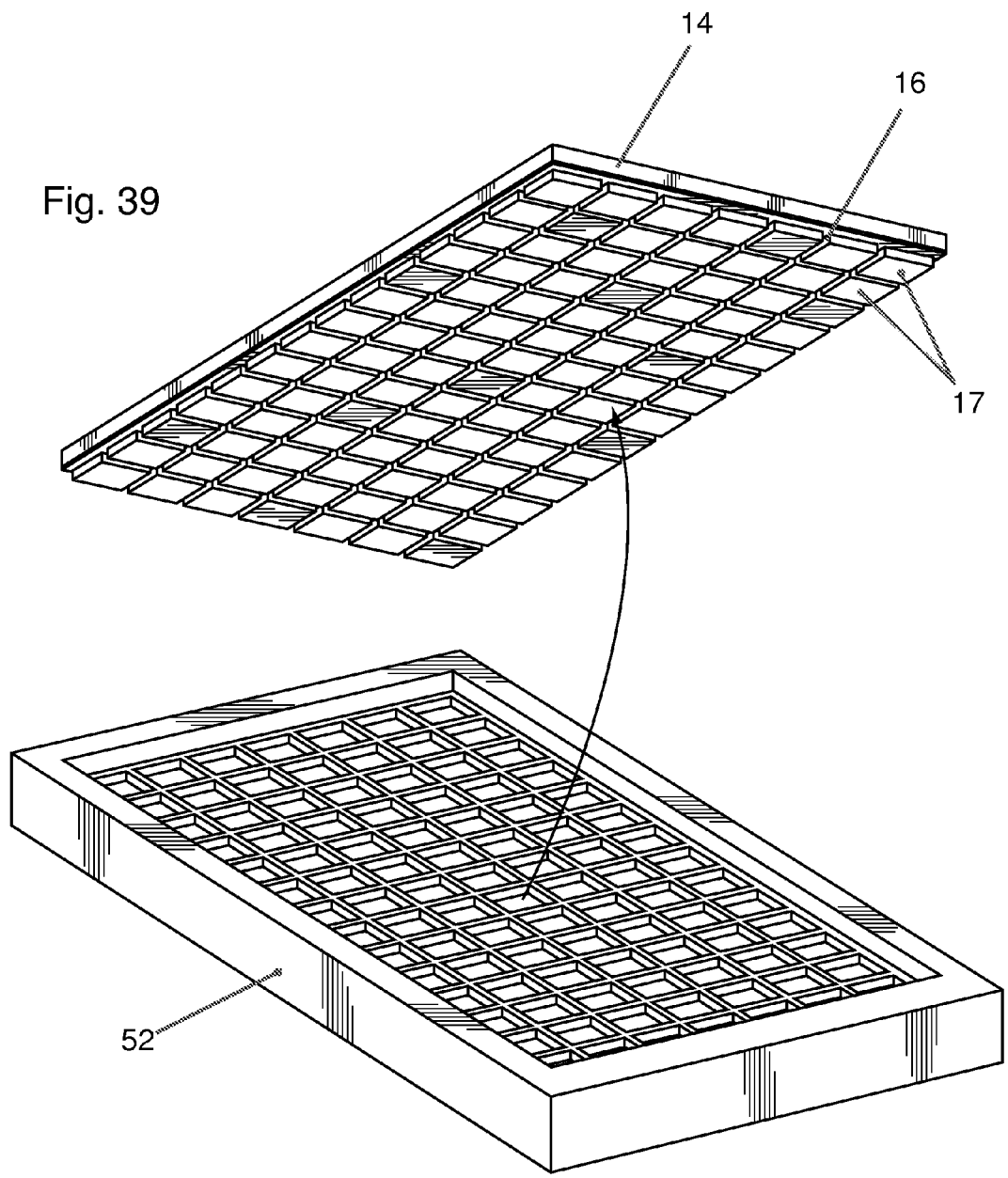
FIG. 39 is a perspective view of the insulating foam panel having been formed with pedestals within the mold and the moisture-resistant film layer fused to the panel's pedestals.

With the insulating foam panel 14 having been formed with pedestals 17 and having been fused to moisture-resistant film 16, as shown in FIG. 39, the combination is then removed from the mold structure (step 400). As shown in FIGS. 40 and 41, the hardboard layer 12 is then adhered to the combination that was removed from the mold structure, thereby to form the subfloor component 10.

Figure 43:
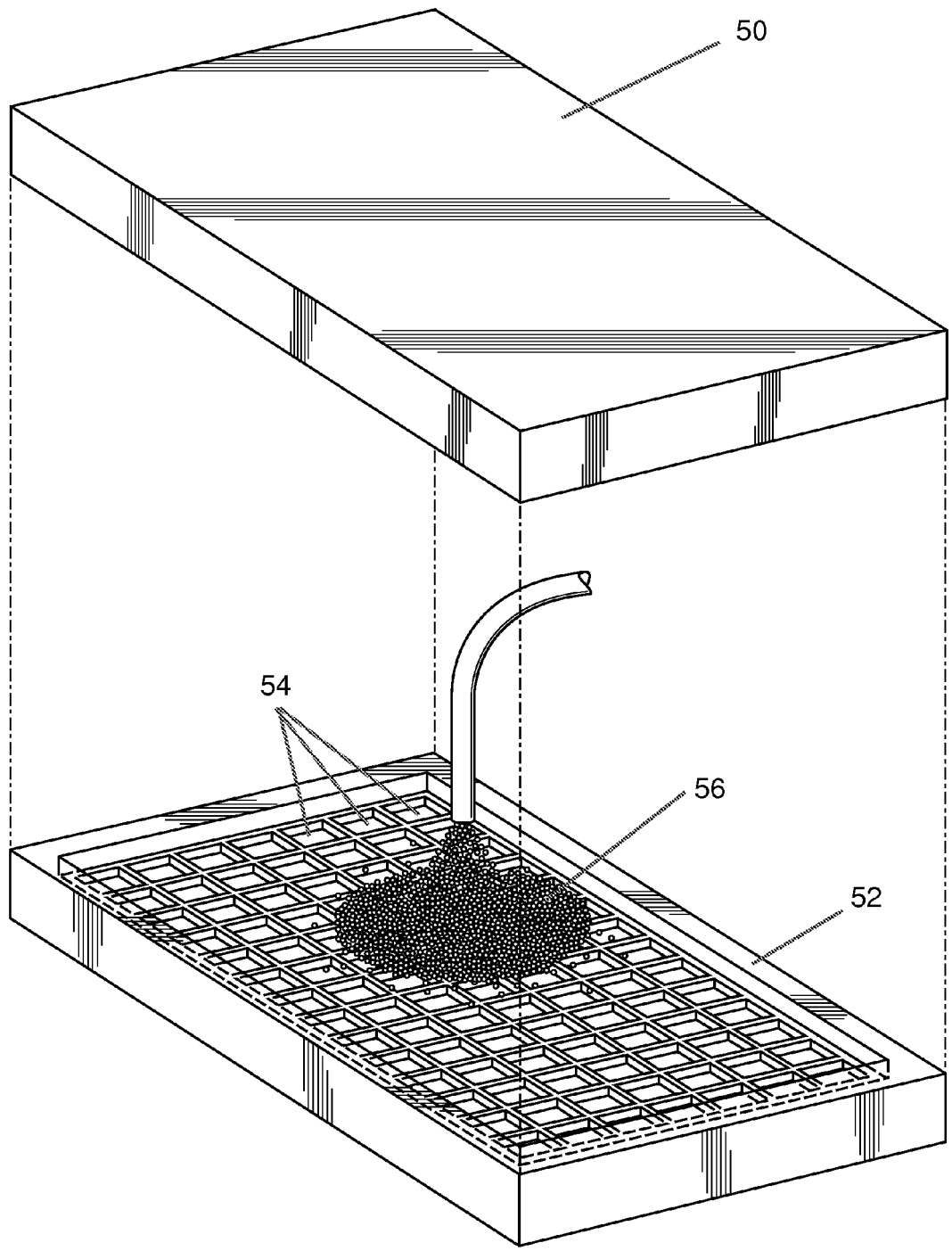
FIG. 43 is a perspective view of expandable polystyrene beads being poured into a mold structure, and against pedestal-forming structures within the mold structure, during manufacture of the subfloor component of FIG. 1, according to another embodiment.

Other methods may be used to manufacture a subfloor component, such as the subfloor component 10 described above. For example, FIG. 47 shows a flowchart of steps of a method of manufacturing a subfloor component such as subfloor component 10 described above. The treatment of the materials involved in some of the steps is illustrated in FIGS. 43 through 46. In FIG. 43, a mold structure is shown as having a top portion 50 and a bottom portion 52. It will be understood that the terms top and bottom may be interchanged with left and right, for example, in the case of a mold structure that stands vertically.

Figure 44:
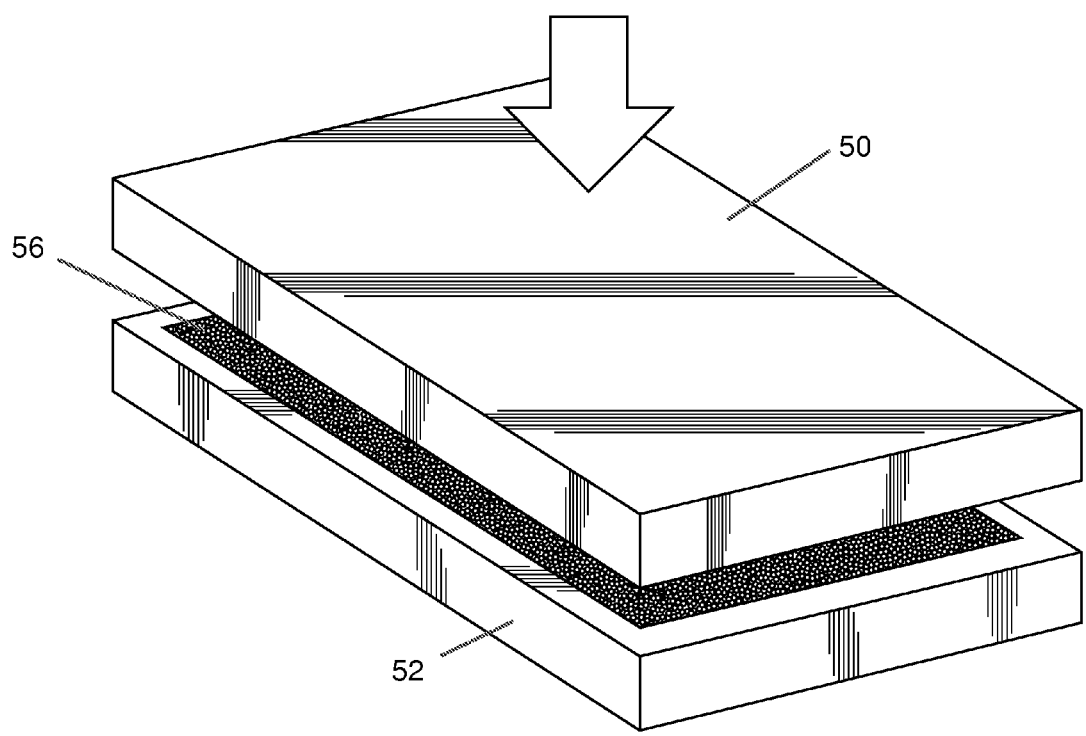
FIG. 44 is a perspective view of the mold structure being closed prior to applying heat to the mold.
Figure 45:
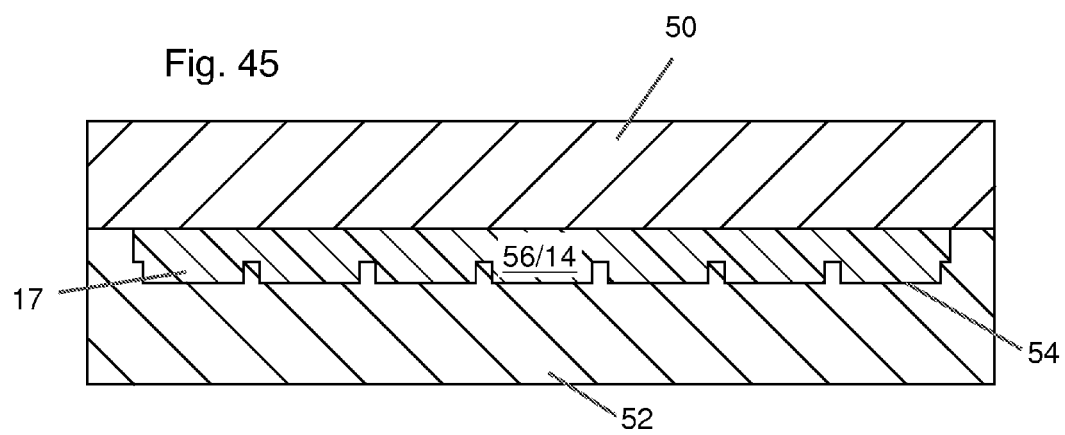
FIG. 45 is a cutaway view of the end of the mold structure enclosing the expandable polystyrene beads while the mold structure is being heated.

First, heat-expandable beads 56 are placed into the mold structure within the bottom portion 52 of the mold structure on top of and therefore adjacent to pedestal-forming structures 54 (step 610), as shown in FIG. 43. As shown in FIG. 44, with the heat-expandable beads 56 within the mold structure between top 50 and bottom 52 portions, the mold structure is then closed. At this point, heat is then applied to the mold structure (step 620) so as to cause the heat-expandable beads 56 to expand and fuse together. While the heat-expandable beads 56 are expanding to form the insulating foam panel 14, the pressure of the expansion causes the expanding beads 56 to enter into and conform to the pedestal-forming structures 54, as shown in the cutaway view of FIG. 45.

Figure 46:
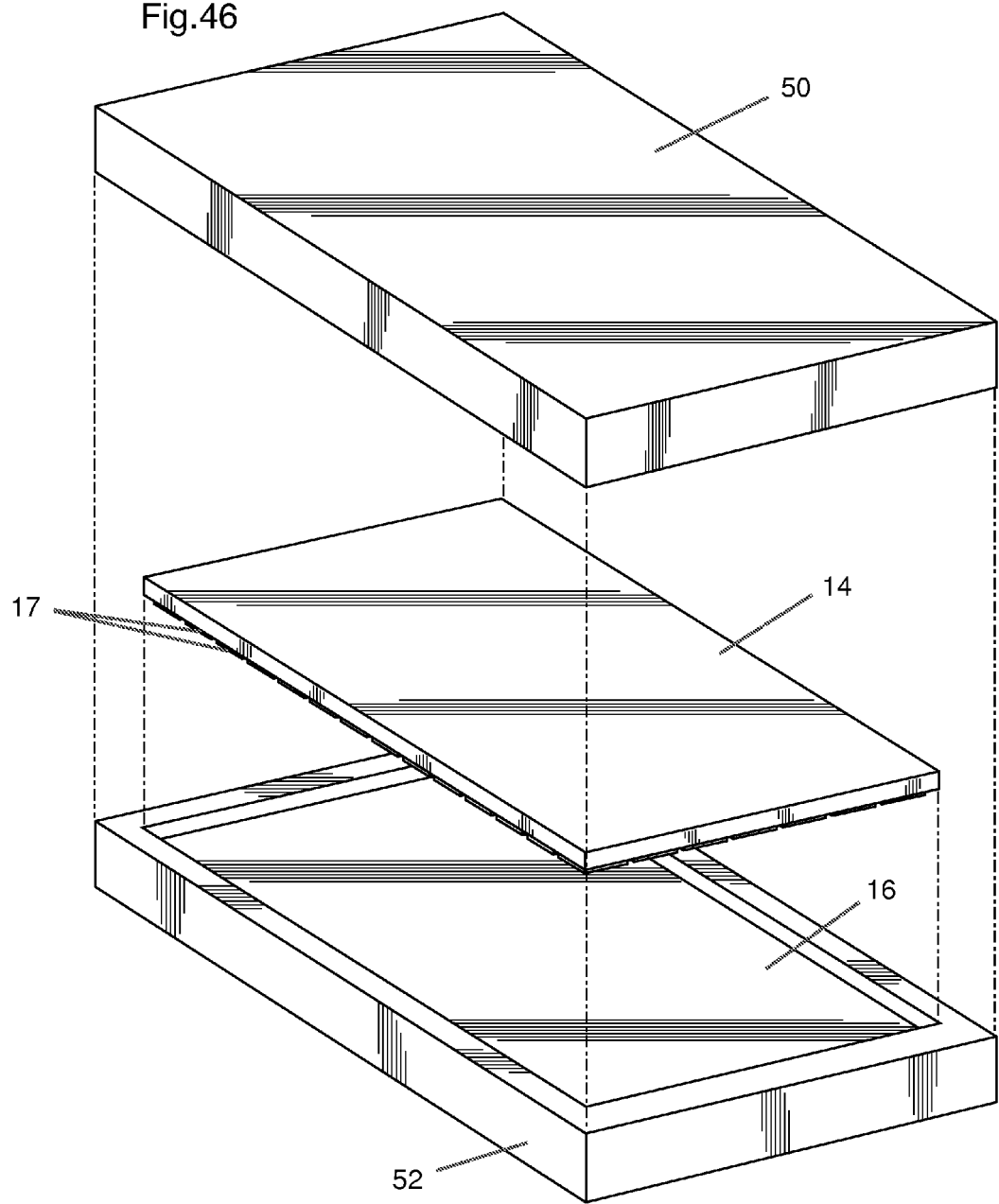
FIG. 46 is a perspective view of a moisture-resistant film layer placed against the pedestal-forming structures within the mold structure, and the insulating foam panel being placed against the moisture-resistant film layer.
Figure 47:
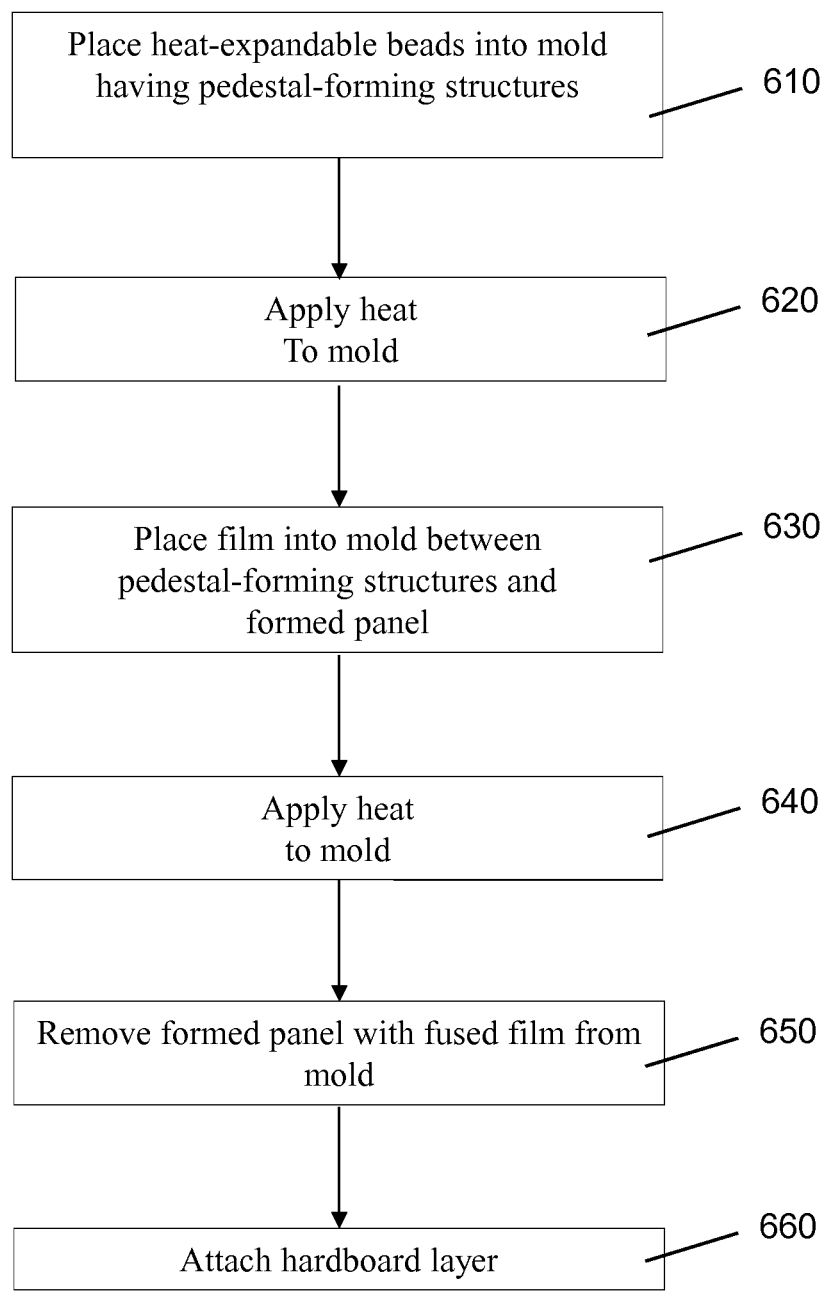
FIG. 47 is a flowchart of steps for manufacturing a subfloor component, according to the embodiment of FIGS. 43 to 46.
Figure 48:
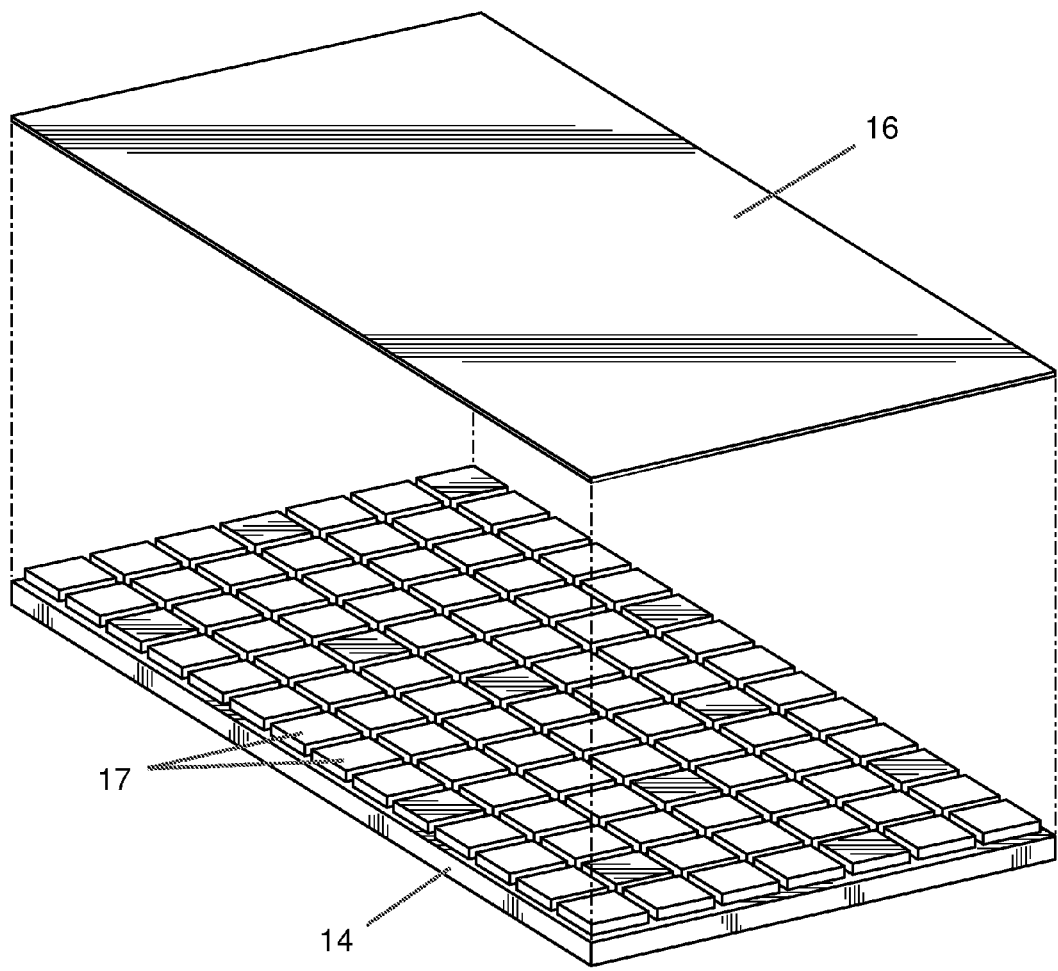
FIG. 48 is a perspective view of a moisture-resistant film layer being placed against an insulating foam panel during manufacture of the subfloor component of FIG. 1, according to another embodiment.

With the insulating foam panel 14 having been formed with pedestals 17, the mold structure is then opened and a generally-flat piece of moisture-resistant film 16 is placed within the bottom portion 52 of the mold structure on top of and therefore adjacent to pedestal-forming structures 54 (step 630), and under the pedestals 17 of the insulating foam panel 14, as shown in FIG. 46. With the moisture-resistant film 16 within the mold structure between the insulating foam panel 14 and bottom portion 52, the mold structure is then closed either partially or completely. Heat is applied to the mold structure (step 640) so as to cause the moisture-resistant film 16 to enter into and conform to the pedestal-forming structures 54 and to the pedestals 17. The moisture-resistant film being of high-impact polystyrene fuses at its surface under the applied heat to the facing surface of the insulating foam panel 14.

With the insulating foam panel 14 having been fused to moisture-resistant film 16, the combination is then removed from the mold structure (step 650). The hardboard layer 12 is then adhered to the combination that was removed from the mold structure (step 660), thereby to form the subfloor component 10.

Figure 49:
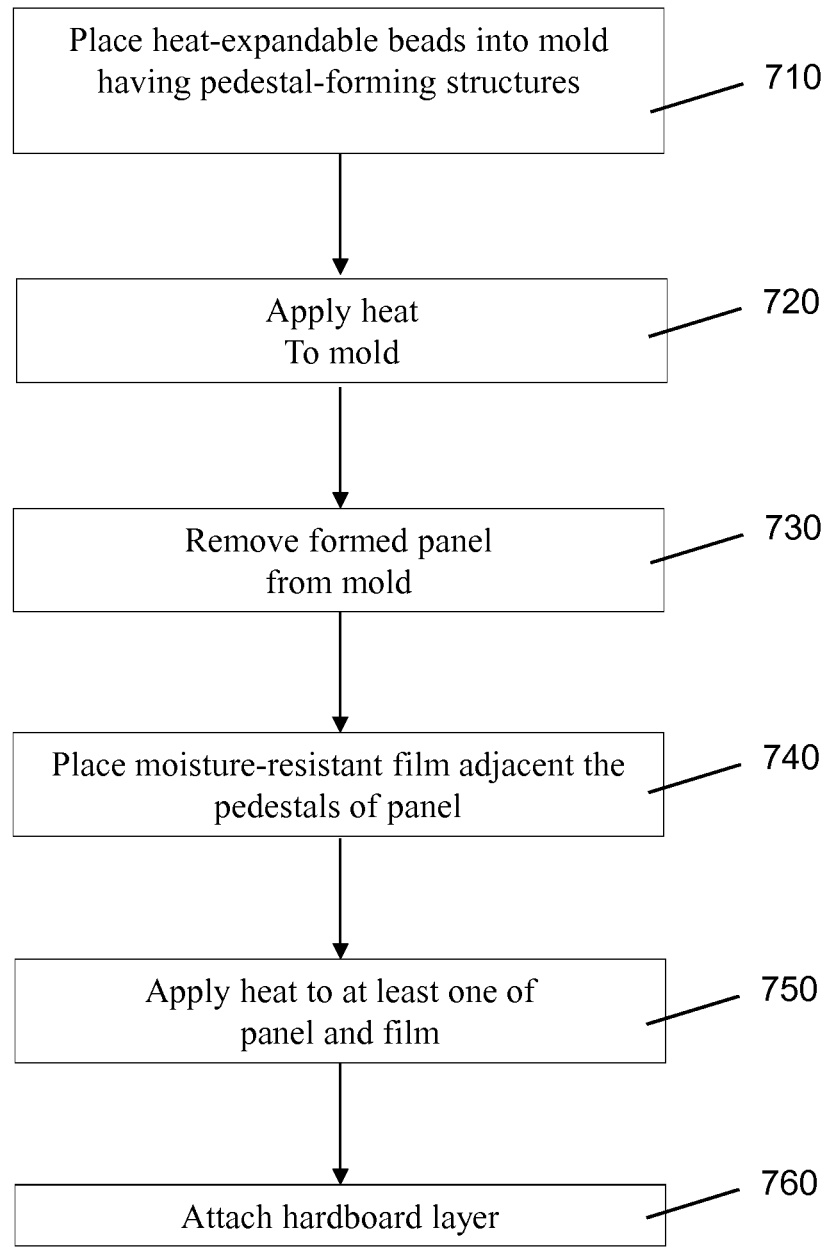
FIG. 49 is a flowchart of steps for manufacturing a subfloor component, according to the embodiment of FIG. 48.

Still other methods may be used to manufacture a subfloor component, such as the subfloor component 10 described above. For example, FIG. 49 shows a flowchart of steps of a method of manufacturing a subfloor component such as subfloor component 10 described above.

First, heat-expandable beads 56 are placed into the mold structure within the bottom portion 52 of the mold structure on top of and therefore adjacent to pedestal-forming structures 54 (step 710), as described above and with reference to FIG. 43. With the heat-expandable beads 56 within the mold structure between top 50 and bottom 52 portions, the mold structure is then closed. Again, it will be understood that the terms top and bottom may be interchanged with left and right, for example, in the case of a mold structure that stands vertically. At this point, heat is then applied to the mold structure (step 720) so as to cause the heat-expandable beads 56 to expand and fuse together. While the heat-expandable beads 56 are expanding to form the insulating foam panel 14, the pressure of the expansion causes the expanding beads 56 to enter into and conform to the pedestal-forming structures 54, as described above and with reference to FIG. 45.

With the insulating foam panel 14 having been formed with pedestals 17, the mold is then opened and the insulating foam panel 14 is then removed from the mold structure (step 730). A generally-flat piece of moisture-resistant film 16 is placed adjacent the tops of the pedestals 17 of the insulating foam panel 14 (step 740). It will be understood that the moisture-resistant film 16 may be placed in contact with and/or in non-contact proximity with tops of the pedestals 17 of the insulating foam panel 14. Heat is then applied to one or both of the moisture-resistant film 16 and the insulating foam panel 14 (step 750), so as to cause the moisture-resistant film 16 to enter into and conform to the pedestals 17 of the insulating foam panel 14. The moisture-resistant film being of high-impact polystyrene fuses at its surface under the applied heat to the facing surface of the insulating foam panel 14.

During this step, the heat may be applied by any suitable heat source, such as for example a hot air blower, one or more heating elements, an oven, and the like.

With the insulating foam panel 14 having been fused to moisture-resistant film 16, the hardboard layer 12 is then adhered to the combination that was removed from the mold structure (step 750), thereby to form the subfloor component 10.

Although in embodiments described above, the subfloor components have tongue and groove configurations along the edges which abut against each other, in other embodiments, other configurations may be used. For example, in other embodiments, the subfloor components may alternatively have grooves along the edges, and with each groove being configured to receive a connector for connecting adjacent subfloor components. The connector may be, for example, a longitudinal connector strip comprising opposing tongues, with each tongue being shaped to be received by a respective groove.

Figure 50:
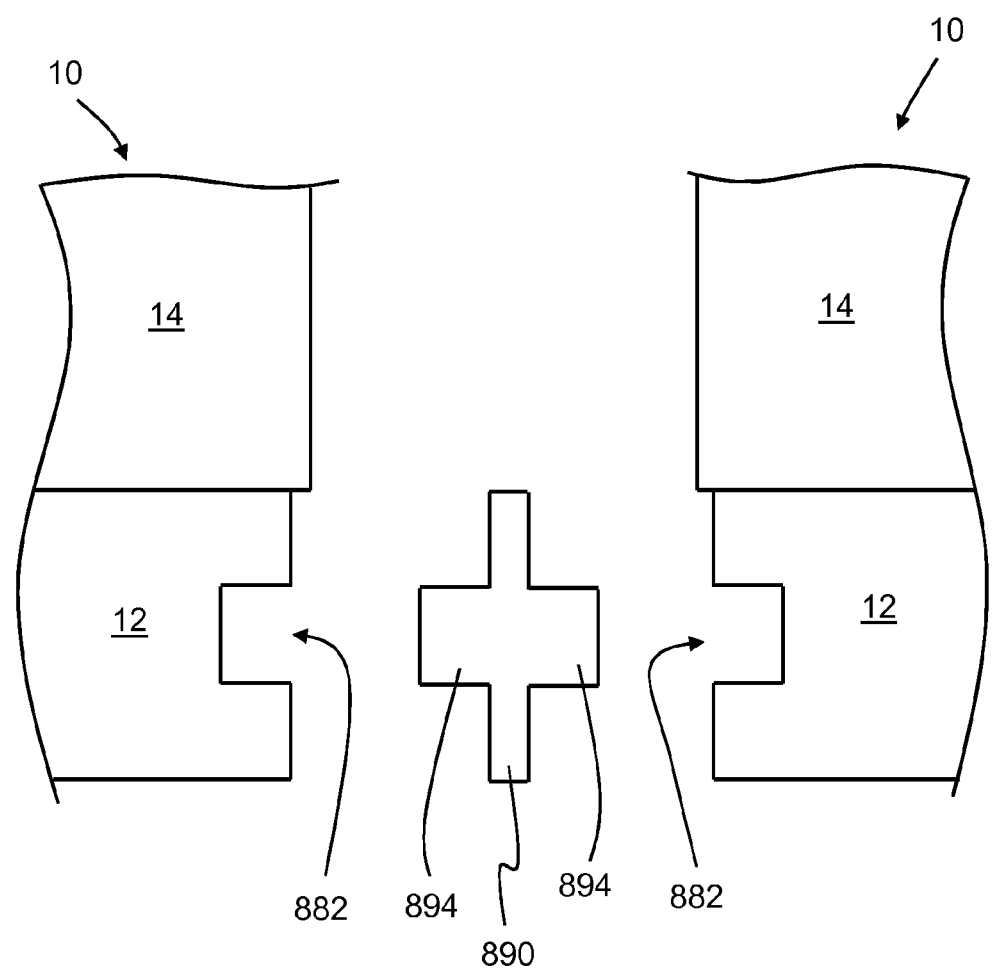
FIG. 50 is an exploded side view of a portion two subfloor components according to another embodiment, and a connector strip therebetween.

For example, FIG. 50 shows two adjacent subfloor components 10, each subfloor component 10 including a hardboard panel 12, an insulating foam panel 14, and a moisture-resistant film (not shown). The insulating foam panel 14 includes first and second opposing faces, with multiple intersecting grooves in the first face defining, in cross-section, multiple pedestals (not shown), as in subfloor component 10 described above and with reference to FIGS. 1 to 5. Each hardboard panel 12 has two (2) grooves 882 formed therein on opposing sides. In this embodiment, the adjacent subfloor components 10 are configured to be connected by a connector in the form of a longitudinal connector strip 890 having a length extending into the page. The connector strip 890 comprises two (2) opposing tongues 894, with each tongue 894 being shaped to be received by a respective groove 882 and having a thickness that provides frictional engagement with the inside of the groove 882 for connecting the adjacent subfloor components 10.

The connector strip 890 may be made of plastic, metal, or one or more other suitable materials, and may be a unitary device or be made of two or more interconnected pieces.

The length of the connector strip 890 may be less than, the same as, or greater than the corresponding length of a particular subfloor component 10. As will be understood, the connector strip 890 functions to align the hardboard layers 12 and to thereby keep the adjacent subfloor components 10 into which it is inserted from shifting relative to each other thereby providing a more unitary subfloor, and generally on the same plane as each other. In the embodiment shown in FIG. 50, each side of the hardboard layer 12 is recessed slightly from the side of the corresponding foam panel 14 so as to accommodate the central body of the connector strip 890 in a way that permits the facing sides of the foam panels 14 to generally contact each other, despite the insertion of the connector strip 890 between the hardboard layers 12. That is, each hardboard layer 12 is recessed an amount corresponding to half the thickness of the central body of the connector strip 890.

In an alternative configuration, one of the hardboard layers 12 may be recessed an amount corresponding to the entire thickness of the central body of the connector strip 890, rather than just half of the thickness, while the hardboard layer 12 that faces the recessed layer is not recessed at all with respect to its corresponding foam panel 14. In this way, the central body of the connector strip 890 is accommodated entirely by the recession of one of the hardboard layers 12. Other configurations for accommodating the central body of the connector strip 890 are possible.

In another alternative configuration, one or both of the opposing tongues 894 of the connector strip may alternatively have barbs extending therefrom for frictionally engaging, or "gripping", the insides of the groove(s) 882 to help with resisting of sliding of the connector strip relative to the subfloor components. As will be understood, such a barbed configuration would make it easy for an installer to insert a connector strip into grooves.

In another alternative configuration, a connector may be provided that has no central body but that simply consists of tongues 894. With such a configuration, there may be a less rigid connection between hardboard layers 12. Advantageously, however, there would be no requirement for recession of one or both hardboard layers 12 to accommodate a central body in this case, and the hardboard layers 12 could therefore be arranged to contact each other in a manner such as is described above for adjacent facing sides of the foam panels 14.

Although in the embodiment shown in FIG. 50, there are grooves formed along two (2) opposing sides of the hardboard panel, in other embodiments, there may alternatively be grooves formed along the four (4) sides of the hardboard panel. The grooves may be formed prior to, or after, attaching the hardboard panel to the insulating foam panel.

The many features and advantages of the invention are apparent from the detailed specification and, thus, it is intended by the appended claims to cover all such features and advantages of the invention that fall within the true purpose of the invention. Further, since numerous modifications and changes will readily occur to those skilled in the art, it is not desired to limit the invention to the exact operation illustrated and described, and accordingly all suitable modifications and equivalents may be resorted to, falling within the purpose and scope of the invention.

For example, the moisture-resistant film may be made of other materials, such as polyethylene, or ABS (Acrylonitrile Butadiene Styrene). Furthermore, materials for the hardboard layer may be selected from plywood, fiber cement board, cement board, metal sheeting, and magnesium oxide board. Other materials, provided that they may be adhered to the insulating foam panel and provide a suitable amount of rigidity, may be employed for a hardboard layer.

Furthermore, while in the embodiments disclosed above the pedestals are generally uniformly distributed across the insulating foam panel, alternatives may be provided having pedestals that are not so uniformly distributed.

What is claimed is:

1. A subfloor component comprising:
   an insulating rigid foam panel having first and second opposing faces and a plurality of intersecting grooves to define, in cross-section, a plurality of pedestals having at least one wall extending into the panel from the first face toward the second face;
   a film of substantially moisture-impervious material attached to the first face of the panel and that conforms to the tops and walls of the pedestals and to the bottoms of the grooves; and
   a hardboard layer on the second face of the panel.

2. The subfloor component of claim 1, wherein the film is fused to the panel.

3. The subfloor component of claim 1, wherein the film comprises material selected from the group comprising plastic or polymer.

4. The subfloor component of claim 3, wherein the plastic or polymer is selected from the group consisting of: high-impact polystyrene, polyethylene, and ABS (Acrylonitrile Butadiene Styrene).

5. The subfloor component of claim 1, wherein each of the plurality of pedestals has a single wall.

6. The subfloor component of claim 5, wherein the pedestals are shaped as circles or ellipses.

7. The subfloor component of claim 1, wherein the panel comprises expanded polystyrene (EPS).

8. The subfloor component of claim 1, wherein the hardboard layer and the panel are attached to each other with glue.

9. The subfloor component of claim 1, wherein the intersecting grooves are rectangular.

10. The subfloor component of claim 1, wherein the pedestals are shaped as at least one of circles, ellipses, rectangles, diamonds, squares, and hexagons.

11. The subfloor component of claim 1, wherein the hardboard layer comprises material selected from the group consisting of: OSB (oriented strand board), plywood, fiber cement board, cement board, metal sheeting, and magnesium oxide board.

12. The subfloor component of claim 1, wherein the subfloor component is shaped to connect to another subfloor component.

13. The subfloor component of claim 12, wherein the hardboard layer comprises a tongue/groove configuration for connecting to another hardboard layer of another subfloor component.

14. The subfloor component of claim 1, wherein the pedestals are generally uniformly distributed across the first surface of the panel.

15. The subfloor component of claim 1, wherein the hardboard layer includes a groove that is open along a side-facing surface of the hardboard layer, further comprising: a connector dimensioned to insert into the groove.

16. The subfloor component of claim 15, wherein the connector comprises:

a central body; and tongues extending outwards from the central body, wherein each tongue is dimensioned to be inserted into a respective groove in a hardboard layer of a subfloor component.

* * * * *